US006580443B2

(12) United States Patent
Yamaguchi et al.

(10) Patent No.: US 6,580,443 B2
(45) Date of Patent: Jun. 17, 2003

(54) COLOR IMAGE FORMING DEVICE WITH SIMPLIFIED OPTICAL UNIT INCORPORATING A LASER SOURCE

(75) Inventors: Chiseki Yamaguchi, Tokyo (JP); Takaaki Watanabe, Tokyo (JP); Takuya Iwamura, Tokyo (JP); Tomoyuki Yoshii, Tokyo (JP); Toshiya Kusayanagi, Tokyo (JP)

(73) Assignee: Fuji Xerox Co., Ltd. (JP)

( * ) Notice: Subject to any disclaimer, the term of this patent is extended or adjusted under 35 U.S.C. 154(b) by 0 days.

(21) Appl. No.: 10/010,545

(22) Filed: Nov. 8, 2001

(65) Prior Publication Data

US 2002/0080219 A1 Jun. 27, 2002

(30) Foreign Application Priority Data

Nov. 10, 2000 (JP) ....................................... 2000-343407

(51) Int. Cl.[7] ......................... G03G 15/01; G02B 26/10

(52) U.S. Cl. ....................... 347/115; 347/118; 347/232; 359/204

(58) Field of Search ................................ 347/115, 116, 347/117, 118, 119, 232, 233; 359/204; 399/299, 302

(56) References Cited

FOREIGN PATENT DOCUMENTS

| | | | | |
|---|---|---|---|---|
| JP | 62266517 | A | * | 11/1987 |
| JP | 6-5409 | B2 | | 1/1994 |
| JP | 7-076137 | | | 3/1995 |
| JP | 8-305115 | | | 11/1996 |
| JP | 2659360 | B2 | | 6/1997 |
| JP | 10-207171 | | | 8/1998 |
| JP | 2000002846 | A | * | 1/2000 |
| JP | 2000-162523 | | | 6/2000 |
| JP | 2000168139 | A | * | 7/2000 |

* cited by examiner

*Primary Examiner*—Joan Pendegrass
(74) *Attorney, Agent, or Firm*—Ostrolenk, Faber, Gerb & Soffen, LLP

(57) ABSTRACT

An intermediate belt made of an endless belt is provided by 45 degrees inclined horizontally and looped over two rollers at both its ends, and four photosensitive drums are provided in contact with the top surface of this intermediate belt. A reflection mirror is provided over each photosensitive drum, and a single polygon mirror is provided on almost the same level as these reflection mirrors. The polygon mirror is provided on the side of the reflection mirror of which optical path to the corresponding photosensitive drum is the longest so that the optical path lengths from the polygon mirror to the respective photosensitive drums are equal to each other.

17 Claims, 15 Drawing Sheets

COLOR IMAGE FORMING DEVICE WITH SIMPLIFIED OPTICAL UNIT INCORPORATING A LASER SOURCE

BACKGROUND OF THE INVENTION

1. Field of the Invention

This invention relates to color image forming devices such as color laser printers and, more particularly, to a color image forming device of which optical unit has a simplified structure.

2. Description of the Related Art

The tandem type color laser printer requires as many photoconductive drums as the colors needed for transferring, and each of the photosensitive drums must be exposed by laser. Thus the conventional color laser printer is equipped with as many scanning optical units as the photosensitive drums for exposing the respective photosensitive drums. This scanning optical unit includes components such as a polygon mirror that reflects laser light to provide a laser scanning plane, a rotation motor that rotates the polygon mirror and a reflection mirror that reflects the laser light reflected by the polygon mirror toward the photosensitive drum.

Such configuration, however, makes the resulting color laser printer expensive because it needs the installation of two or more polygon mirrors and rotation motors. Besides, since the device includes two or more scanning optical units that are similar to each other in its housing, the dimensions of the whole device grow, making it difficult to provide a compact device and easy maintenance. To solve these problems, a number of proposals have been made as follows.

FIG. 1 is a schematic diagram showing the configuration of the color image forming device disclosed in Japanese Patent Laid-Open Publication No. Hei. 10-207171. Referring now to FIG. 1, in order to make maintenance of the color image forming device easy, the exposure units 102 including polygon mirrors are collected in a specific site 104 in the housing, instead of the respective sites over the image forming units 103 including photosensitive drums. Inside the housing, a plurality of reflection mirrors 105 are provided for reflecting the laser light 101 provided by each exposure unit 102 and then directing the laser to each image formation unit 103. The image formation unit 103, which forms an image on a recording medium 106, is provided so that the recording medium 106 runs under the respective image formation units 103 one after another. In the downstream of the transfer path of the recording medium 106 beyond the image formation units 103, a fixing unit 107 is provided to fix the image created on the recording medium 106. In the device shown in FIG. 1, two or more exposure units 102 provide laser beams 101 and then two or more reflection mirrors 105 reflect the provided laser beams 101 toward the respective image formation units 103. Each image formation unit 103 forms an image on the recording medium 106, and then the fixing unit 107 fixes the formed image on the recording medium 106.

FIG. 2 is a schematic diagram showing the configuration of the color image forming device disclosed in Japanese Patent Laid-Open Publication No. Hei. 7-76137. Referring to FIG. 2, in order to reduce the quantity of polygon mirrors 108 and simplify the structure of the color image forming device, a single exposure unit 102 is provided over a position close to the center of a series of image formation units 103*a*–103*d*. The exposure unit 102 has a single rotation motor (not shown) that rotates a pair of polygon mirrors 108, and these polygon mirrors 108 expose the respective photosensitive drums. Namely, the pair of polygon mirrors 108 provide four laser beams 101 and two or more reflection mirrors 105 reflect these laser beams 101 toward the image formation units 103*a*–103*d* for image formation.

FIG. 3 is a schematic diagram showing the configuration of the color image forming device disclosed in Japanese Patent Laid-Open Publication No. Hei. 6-5409. Referring now to FIG. 3, in order to reduce the quantity of polygon mirrors 108 to one in the color image forming device of this type, a single polygon mirror 108 is provided on either side of a series of photosensitive drums 109. And, a number of reflection mirrors 105 direct the respective laser beams 101 to each photosensitive drum 109 to expose each photosensitive drum 109 are provided. The color image forming device described in Japanese Patent No. 2659360 has a configuration similar to this device.

FIG. 4 is a schematic diagram showing the configuration of the color image forming device disclosed in Japanese Patent Laid-Open Publication No. 2000-162523. Referring now to FIG. 4, the color image forming device of this type employs a single polygon mirror 108, and a plurality of reflection mirrors 105 reflect the laser beams 101 to guide them to photosensitive drums 109.

FIG. 5 is a schematic diagram showing the configuration of the color image forming device disclosed in Japanese Patent Laid-Open Publication No. Hei. 8-305115. Referring now to FIG. 5, in order to reduce the quantity of polygon mirrors to one and eliminate reflection mirrors in the color image forming device, two or more photosensitive drums 109 are arranged around the polygon mirror 108, and the laser beams 101 provided by the polygon mirror 108 are directly guided to the respective photosensitive drums 109 without using any reflection mirrors for exposure of the photosensitive drums 109.

Such conventional devices, however, have the following problems. In the color image forming device of FIG. 1 disclosed in Japanese Patent Laid-Open Publication No. Hei. 10-207171, the resulting improvement is limited to that the exposure units 102 are collected in a specific position in the housing. It still needs a number of reflection mirrors 105 and therefore its device cost may become even higher. Even if the quantities of exposure units 102 and polygon mirrors 108 are each reduced to one, there is no change in the quantity of reflection mirrors 105, and the problem in terms of cost is left unsolved.

In the color image forming device of FIG. 2 disclosed in Japanese Patent Laid-Open Publication No. Hei. 7-76137, the laser beams 101 reflected by the polygon mirrors 108 conduct laser scanning in different directions between the image formation units 103*a*–103*b* and those 103*c*–103*d*. Then it poses a problem that the registration accuracy in the horizontal direction, which is an important factor in creating color images of high quality, becomes low. Also in this prior art device, the necessity of assembly and adjustment of such a multitude of reflection mirrors 105 leads to high costs and poor maintenance.

The color image forming devices of FIG. 3 disclosed in Japanese Patent Publication No. Hei. 6-5409 and Japanese Patent No. 2659360 use a multitude of reflection mirrors 105, as is the case with the color image forming device disclosed in Japanese Patent Laid-Open Publication No. Hei. 7-76137. Thus the device cost is raised and maintenance becomes hard to perform.

Also a multitude of reflection mirrors 105 are used in the color image forming device of FIG. 4 disclosed in Japanese Patent Laid-Open Publication No. 2000-162523, as is the case with the color image forming devices disclosed in Japanese Patent Laid-Open Publication No. Hei. 7-76137 and Japanese Patent Publication No. Hei. 6-5409. As a result, the device cost is raised, and it becomes difficult to make the device compact and maintenance easy.

Also in the color image forming device of FIG. 5 disclosed in Japanese Patent Laid-Open Publication No. Hei. 8-305115, the device becomes too large for practical use because its optical unit occupies a large installation space.

SUMMARY OF THE INVENTION

It is an object of the present invention to provide a color image forming device equipped with a simple scanning optical unit that makes the device cost low, device size compact and maintenance easy.

A color image forming device according to the present invention forms a color image of a plurality of colors onto a recording medium. This color image forming device has a laser source for emitting a plurality of laser beams based on image information, a plurality of photosensitive drums, one polygon mirror that rotates and reflects laser beams emitted from the laser sources for laser scanning, and a plurality of reflection mirrors provided for the respective photosensitive drums and located in an optical path between the polygon mirror and each of the photosensitive drums. The reflection mirrors reflect the laser beams traveling from the polygon mirror towards the photosensitive drums for scanning the respective photosensitive drums. The reflection mirror that has the longer optical path from the reflection mirror to the corresponding photosensitive drum is provided more closely to the polygon mirror than the reflection mirror having the optical path from the reflection mirror to the corresponding photosensitive drum shorter than that of the reflection mirror of longer optical path. And, all optical path lengths from the polygon mirror to the corresponding photosensitive drums via the reflection mirrors are equal to each other. Further, this color image forming device has developing units for developing latent electrostatic images formed by the laser beams on the photosensitive drums to provide an intermediate image formed by mono-color developer, an intermediate image carrier made of an endless belt and driven in one direction, the photosensitive drums which are provided along the intermediate image carrier and are in contact with and rotated with the intermediate image carrier to transfer the intermediate images of mono-color to the intermediate image carrier so as to overlap each other to form a color developer image, a transfer unit for transferring the color developer image from the intermediate image carrier to the recording medium, and a fixing unit for fixing the color developer image on the recording medium.

In the present invention, the reflection mirror having the longer optical path from the reflection mirror to the corresponding photosensitive drum is provided more closely to the polygon mirror than the reflection mirror having the optical path from the reflection mirror to the corresponding photosensitive drum shorter than that of the reflection mirror of longer optical path. Then it becomes possible to make the optical path lengths of the laser beams from the polygon mirror to each photosensitive drum via the reflection mirrors equal to each other and limit the quantity of polygon mirrors to one. In addition, it is also possible to make the number of the reflection mirrors the same as that of the photosensitive mirrors, namely, the number of colors used in images. Then the structure of the optical unit, that has the laser source, the polygon mirror and the reflection mirrors, can be simplified.

The plurality of photosensitive drums may be provided on a imaginary flat plane which makes an angle larger than zero degree and less than 90 degrees with a scanning plane of the laser beams from the polygon mirror. Then, the device can be done miniaturization and improved the precision.

Another color image forming device according to the present invention forms a color image of a plurality of colors onto a recording medium. This color image forming device has a laser source for emitting a plurality of laser beams based on image information, a plurality of photosensitive drums, one polygon mirror that rotates and reflects laser beams emitted from the laser sources for laser scanning, and a plurality of reflection mirrors which are provided for the respective photosensitive drums and located in an optical path between the polygon mirror and each of the photosensitive drums. The reflection mirrors reflect the laser beams traveling from the polygon mirror towards the photosensitive drums for scanning the respective photosensitive drums. The reflection mirror that has the longer optical path from the reflection mirror to the corresponding photosensitive drum is provided more closely to the polygon mirror than the reflection mirror that has the optical path from the reflection mirror to the corresponding photosensitive drum shorter than that of the reflection mirror of longer optical path. And, all optical path lengths from the polygon mirror to the corresponding photosensitive drums via the reflection mirrors are equal to each other. Further, this color image forming device has developing units for developing latent electrostatic images formed by the laser beams on the photosensitive drums to provide an intermediate image formed by mono-color developer, a recording medium transport unit made of an endless belt and driven in one direction, which transports the recording medium. The photosensitive drums are provided along the recording medium transport unit and are in contact with and driven with the recording medium to transfer the intermediate images of mono-color to the recording medium so as to overlap each other to form a color developer image. Further, this color image forming device has a fixing unit for fixing the color developer images on the recording medium.

In the present invention, the reflection mirror having the longer optical path from the reflection mirror to the corresponding photosensitive drum is provided more closely to the polygon mirror than the reflection mirror having the optical path from the reflection mirror to the corresponding photosensitive drum shorter than that of the reflection mirror of longer optical path. Then it becomes possible to make the optical path lengths of the laser beams from the polygon mirror to each photosensitive drum via the reflection mirrors equal to each other and limit the quantity of polygon mirrors to one. In addition, it is also possible to make the number of the reflection mirrors the same as that of the photosensitive mirrors, namely, the number of colors used in images. Then the structure of the optical unit can be simplified. Since the developer image is transferred directly from the photosensitive drums onto the recording medium, the device structure can be simplified as well.

Still another color image forming device according to the present invention forms a color image of a plurality of colors onto a recording medium. This color image forming device has a laser source for emitting a plurality of laser beams based on image information, a photosensitive belt made of an endless belt and driven in one direction, on which the laser beams are exposed at a plurality of laser beam exposure portions different from each other and provided along on the photosensitive belt, and a plurality pairs of an electrostatic charger and a developing roller provided for each of the laser beam exposure portions. The electrostatic charger charges the photosensitive belt and the developing roller develops a latent image formed by exposure of the laser beam. This color image forming device has further, one polygon mirror that rotates and reflects laser beams emitted from the laser sources for laser scanning, and a plurality of reflection mirrors which reflects the laser beams traveling from the polygon mirror towards the photosensitive belt for scanning the photosensitive belt at the laser beam exposure portions, to form the latent images so as to form intermediate images of mono-color developer by the developing roller on the photosensitive belt driven in one direction so as to overlap each other to form a color developer image. The reflection mirror that has the longer optical path from the reflection mirror to the corresponding laser beam exposure portion is provided more closely to the polygon mirror than the reflection mirror that has the optical path from the reflection mirror to the corresponding exposure portion shorter than that of the reflection mirror of longer optical path. And, all optical path lengths from the polygon mirror to the corresponding exposure portions via the reflection mirrors are equal to each other. Further, this color image forming device has a transfer unit for transferring the color developer image from the photosensitive belt to the recording medium, and a fixing unit for fixing the color developer images on the recording medium.

In the present invention, the reflection mirror that has the longer optical path from the reflection mirror to the corresponding exposure portion is provided more closely to the polygon mirror than the reflection mirror that has the optical path from the reflection mirror to the corresponding exposure portion shorter than that of the reflection mirror of longer optical path. Then it becomes possible to make the optical path lengths of the laser beams from the polygon mirror to each exposure portions on the photosensitive belt via the reflection mirrors equal to each other and limit the quantity of polygon mirrors to one. In addition, it is also possible to make the number of the reflection mirrors the same as that of the exposure portions, namely, the number of colors used in images. Then the structure of the optical unit can be simplified. In addition, the device can be made compact and inexpensive because the quantity of photoreceptors is limited to one by adopting the photosensitive belt made of an endless belt.

The endless belt, namely, intermediate image carrier, recording medium transport unit and photosensitive belt may be provided more closely to the polygon mirror than the fixing unit. Then the influence of heat generated in the fixing unit upon the polygon mirror can be weakened.

As described above, since the color image forming device according to the present invention has a simplified scanning optical unit, it can be cost-effective, compact and easy for maintenance. This invention can be applied to the color image forming device whether it employs a method of using an intermediate belt or a method of transferring images directly onto the recording medium.

DETAILED DESCRIPTION OF THE PREFERRED EMBODIMENTS

Figure 1:
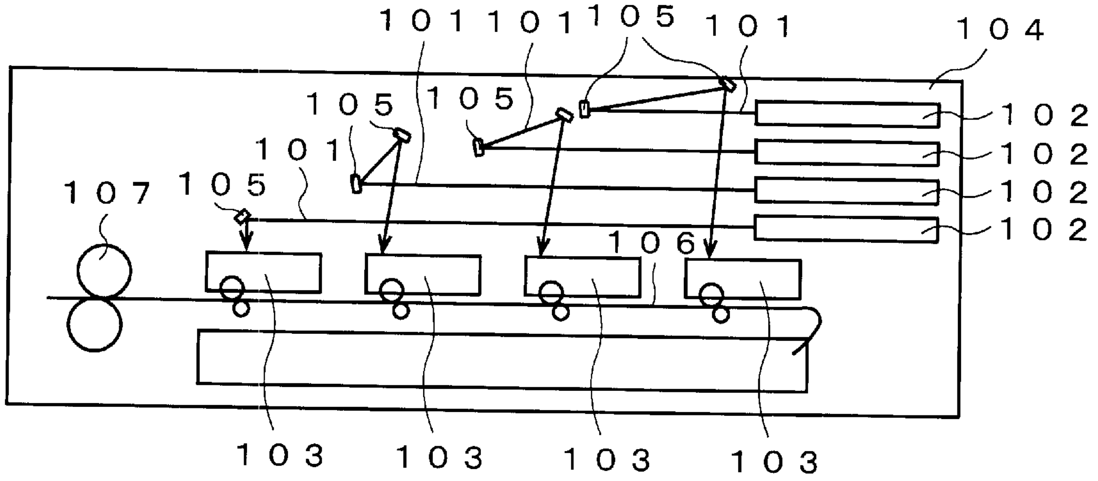
FIG. 1 (PRIOR ART)
FIG. 1 is a schematic diagram showing the configuration of a prior art color image forming device.
Figure 2:
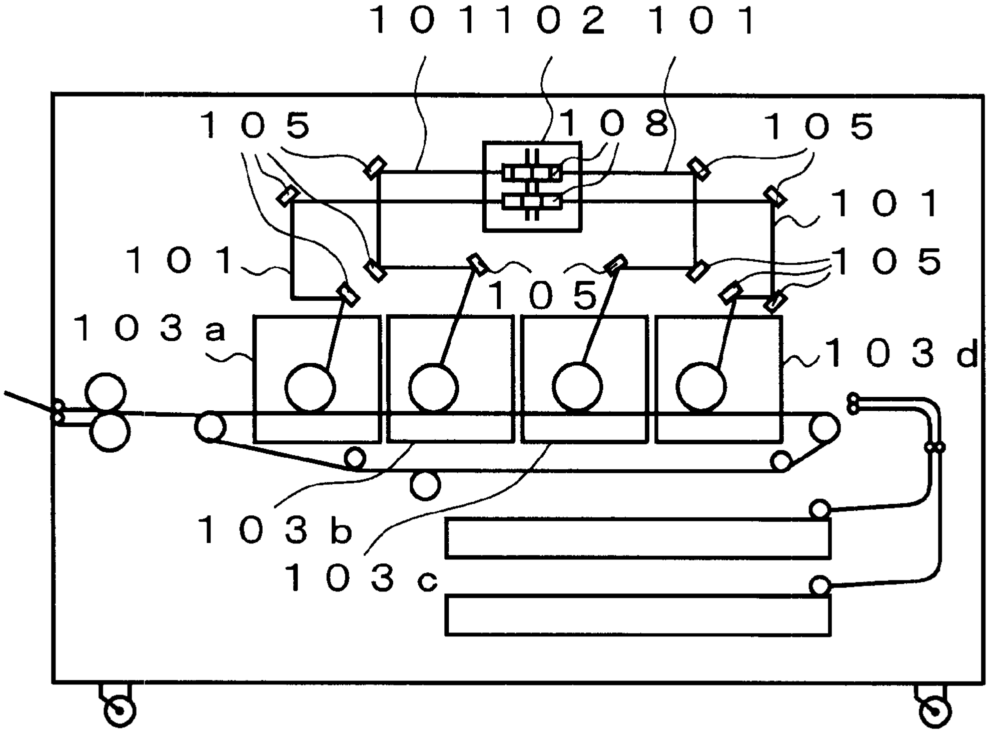
FIG. 2 (PRIOR ART)
FIG. 2 is a schematic diagram showing the configuration of another prior art color image forming device.
Figure 3:
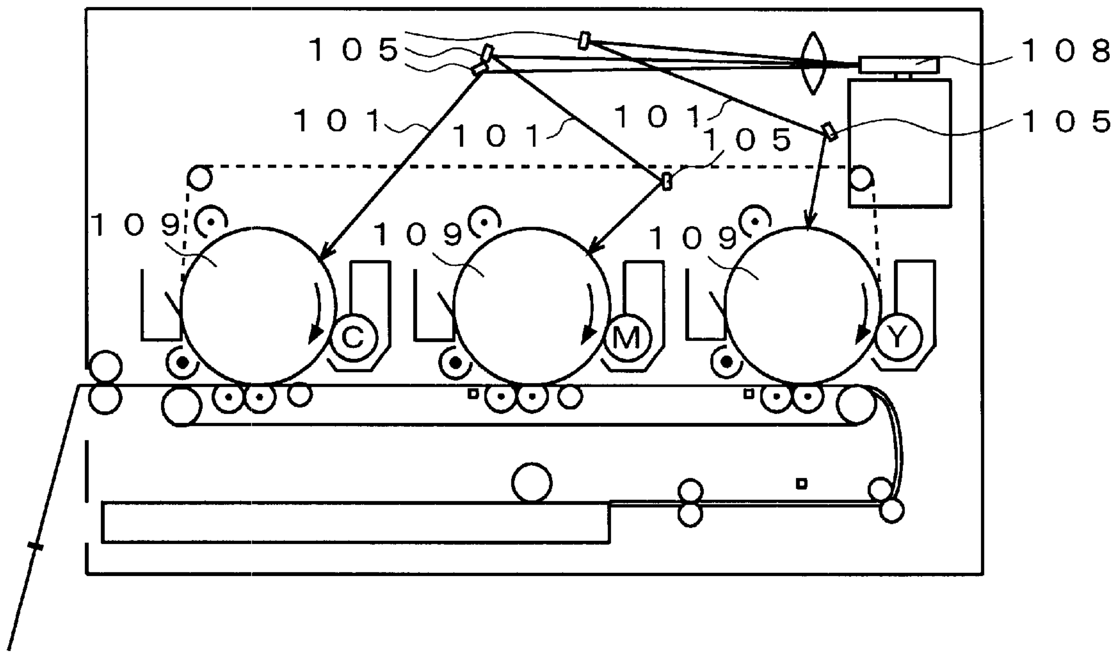
FIG. 3 (PRIOR ART)
FIG. 3 is a schematic diagram showing the configuration of another prior art color image forming device.
Figure 4:
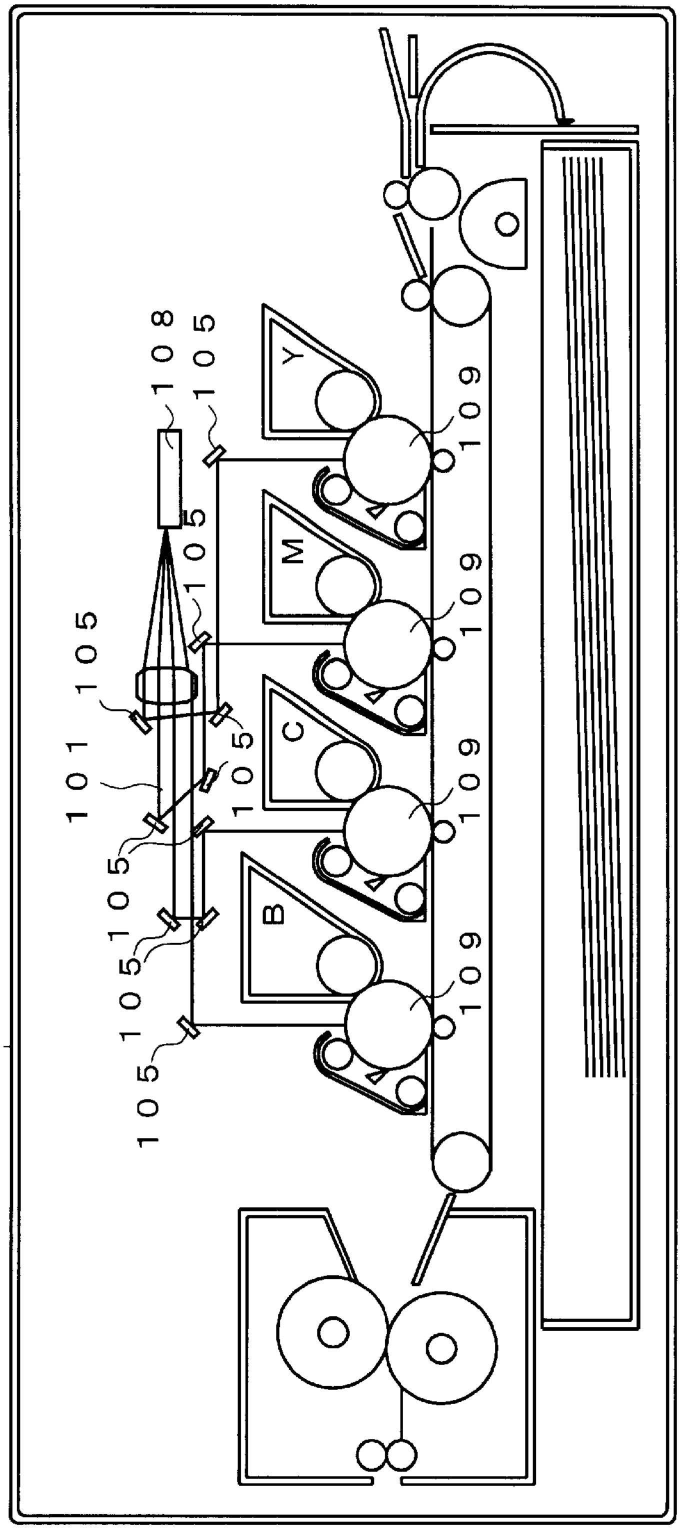
FIG. 4 (PRIOR ART)
FIG. 4 is a schematic diagram showing the configuration of another prior art color image forming device.
Figure 5:
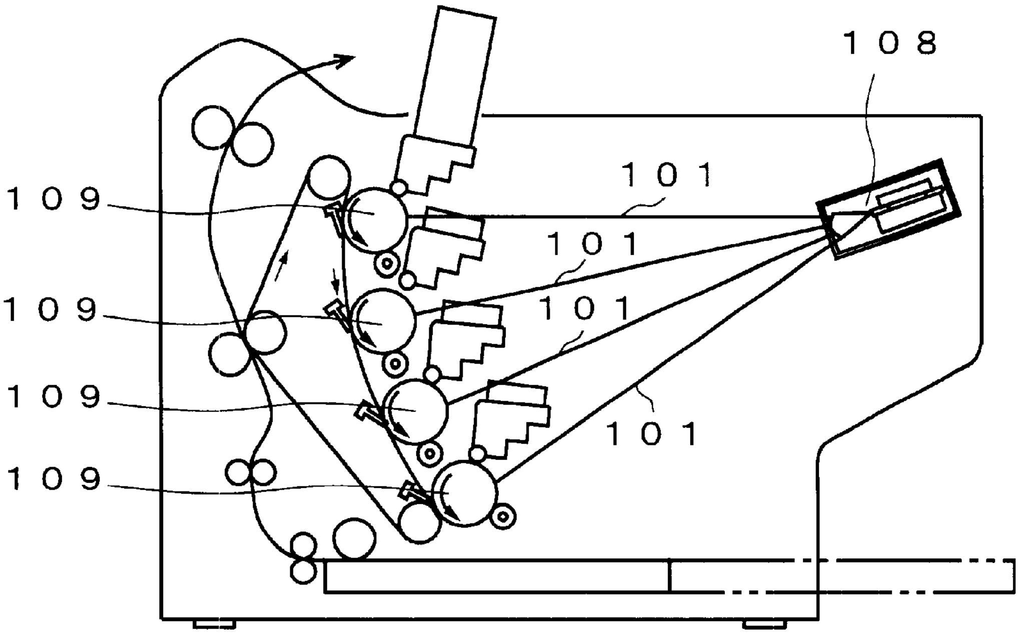
FIG. 5 (PRIOR ART)
FIG. 5 is a schematic diagram showing the configuration of another prior art color image forming device.
Figure 6:
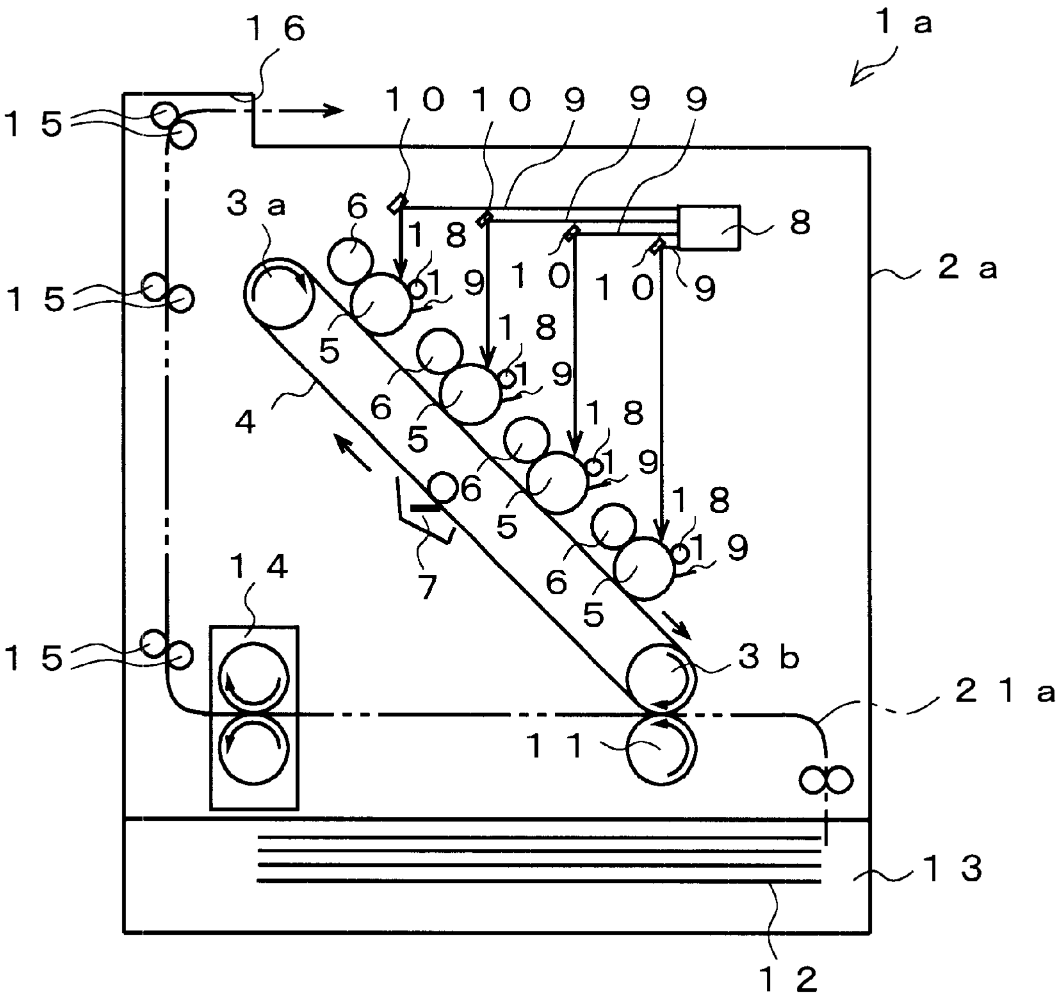
FIG. 6 is a schematic diagram showing the configuration of a color image forming device according to a first embodiment of the present invention.

Preferred embodiments of the present invention will be described in detail with reference to the attached drawings below. First, a first embodiment of the present invention is explained. FIG. 6 is a schematic diagram showing the configuration of a color image forming device 1*a* according to the present embodiment. Referring now to FIG. 6, the color image forming device 1*a* has a housing 2*a* that covers the whole device, and inside the housing 2*a* an endless belt is provided that is an inclined intermediate belt 4 looped over rollers 3*a*, 3*b*. In this embodiment, the inclination angle of the intermediate belt 4 is around 45 degrees against the horizontal direction. The roller 3*a* is mounted above the roller 3*b*. A photosensitive drum 5 forms an intermediate image formed by developer on the surface of the intermediate belt 4, and the intermediate belt 4 transfers the intermediate image onto a recording medium.

On the upper surface of the inclined intermediate belt 4, four rotary cylinders, namely photosensitive drums 5, are mounted to form respective color images on the intermediate belt 4 using laser light 9. A developing unit (not shown) filled with a developer is provided in contact with the photosensitive drum 5, and the colors of these developers are different from each other. A developing roller 6 is provided inside each developing unit. Around each photosensitive drum 5 provided are a charger 18 that provides the photosensitive drum 5 with electrostatic charge and a cleaner 19 that cleans the surface of the photosensitive drum 5. Further, four transferring rollers (not shown) are provided so that they face the respective photosensitive drums 5 beyond the intermediate belt 4. A transferring bias is applied to the transferring rollers in order to transfer the electrostatic image formed on the surface of the photosensitive drum 5 onto the intermediate belt 4. In addition, an intermediate belt cleaner 7 is provided on the bottom side of the inclined intermediate belt 4 so that it contacts the intermediate belt 4 and cleans the surface of the intermediate belt 4.

Referring now to FIG. 6, a polygon mirror 8 is located in a position higher than the leftmost, uppermost photosensitive drum 5 and at the same time to the right of the lowermost, rightmost photosensitive drum 5 in the space above the intermediate belt 4 inside the housing 2*a*. Each of four reflection mirrors 10 is provided immediately above each photosensitive drum 5 at the same level as the polygon mirror 8. The polygon mirror 8 reflects the laser beams 9 provided by the laser source (not shown) toward the reflection mirrors 10 in the horizontal direction. Namely, the reflection mirror 10 having the longer optical path from the reflection mirror 10 to the corresponding photosensitive drum 5 is provided more closely to said polygon mirror 8 than the reflection mirror 10 having the optical path from the reflection mirror 10 to the corresponding photosensitive drum 5 shorter than that of the reflection mirror 10 of longer optical path. The polygon mirror 8 rotates for scanning with the laser beams 9, keeping a predetermined angle to the horizontal direction.

Under the roller 3*b*, a secondary transferring roller 11 is provided in contact with the roller 3*b* via the intermediate belt 4 and paper 12 that serves as the recording medium. The secondary roller 11 transfers the image formed on the surface of the intermediate belt 4 onto the paper 12. A paper cassette 13 is provided at the bottom of the housing 2*a* for storing paper 12. A fixing unit 14 that fixes the image transferred on the paper 12 is provided in between the intermediate belt 4 and the paper cassette 13. Further, inside the housing 2*a*, transfer rollers 15 are provided to transport the paper 12 on which image has been fixed by the fixing unit 14. The housing 2*a* has an eject window 16 at the top thereof to eject the paper 12.

The transport path 21*a* of the paper 12 in the color image forming device 1*a* lies almost horizontally over the way from the paper cassette 13 to the fixing unit 14 via between the transport roller 3*b* and the secondary transferring roller 11, while the path changes its direction upwards after passing the fixing unit 14 and reaches the eject window 16 via a number of transfer rollers 15.

Figure 7:
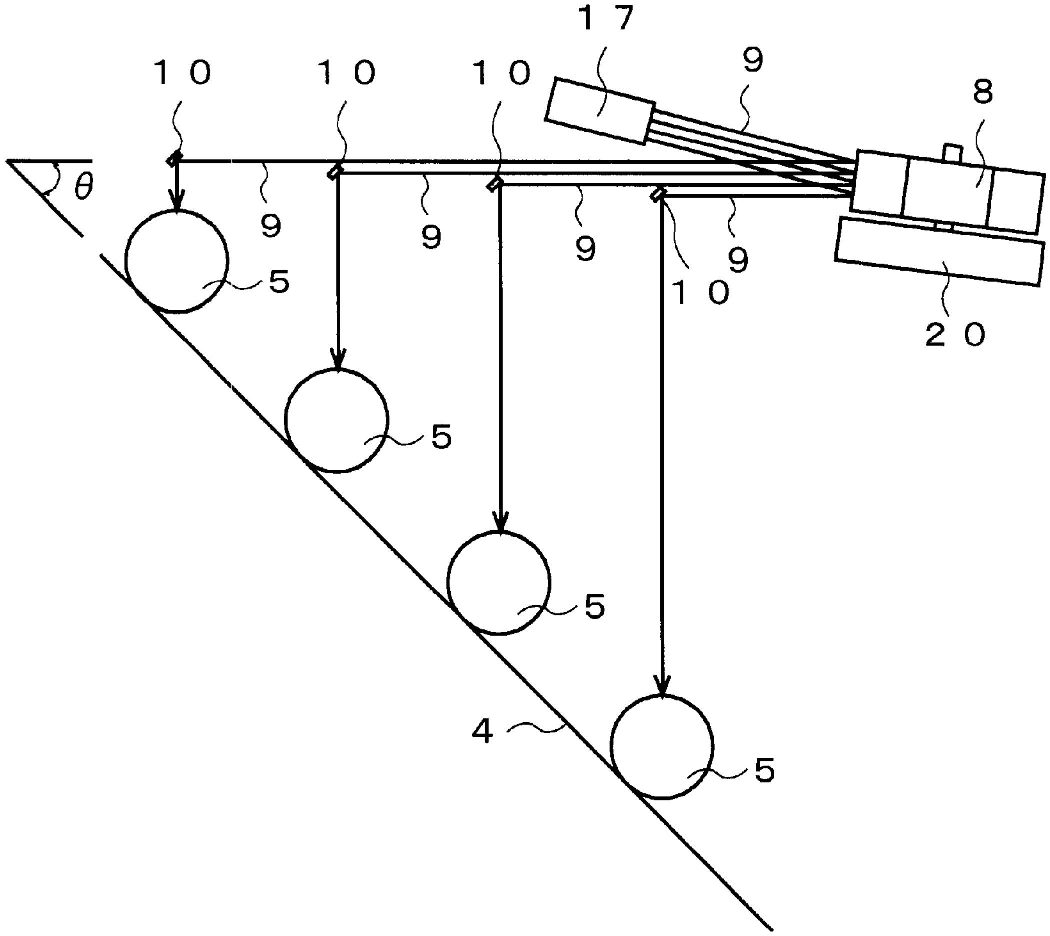
FIG. 7 is a schematic diagram showing the configuration of the scanning optical unit of the color image forming device according to the present embodiment.

FIG. 7 is a schematic diagram showing the configuration of the scanning optical unit in the color image forming device 1*a*. As shown in FIG. 7, the scanning optical unit of the color image forming device 1*a* has a single polygon mirror 8, the laser sources 17 at least of the same quantity as the photosensitive drums 5, and the reflection mirrors 10 at least of the same quantity as the photosensitive drums 5. In this embodiment, four laser sources 17 and four reflection mirrors 10 are prepared for the four photosensitive drums 5. A laser beam 9 is emitted from each laser source 17, reflected on the polygon mirror 8, reflected on each reflection mirror 10, and enters each photosensitive drum 5 to form the image of each color on the surface of the photosensitive drum 5. A motor 20 for rotating the polygon mirror 8 is provided under the polygon mirror 8 to be connected with each other.

The laser sources 17 and the polygon mirror 8 are located so that the spots on the polygon mirror 8 irradiated by the laser beams 9 emitted from the laser sources 17 are arrayed in the thickness direction of the polygon mirror 8 so as not to overlap each other.

The four laser beams 9 emitted from the laser sources 17 hit the reflection face of the polygon mirror 8 in parallel, keeping an inclination angle to the surface of the polygon mirror 8. The four laser beams 9 are reflected in parallel to each other on the reflection face of the polygon mirror 8. Then a horizontal laser scanning is conducted by the rotation of the polygon mirror 8. FIG. 7 is an enlarged drawing that demonstrates how the laser beams 9 are reflected on the reflection face of the polygon mirror 8.

In the scanning optical unit of the color image forming device 1*a*, the photosensitive drums are provided on a imaginary flat plane. And the imaginary flat plane makes an angle, θ, with the plane of scanning laser beams 9 controlled by the rotation of the polygon mirror 8. The angle θ is larger than zero and less than 180 degrees measured from the direction of the laser beams 9 emitted from the polygon mirror. Preferably, angle θ should be larger than zero to less than 90 degrees, more preferably, between 15 and 75 degrees. In this embodiment, the scanning plane is horizontal and the plane circumscribing the photosensitive drums 5 is inclined by about 45 degrees against the horizontal direction. Therefore, angle θ is about 45 degrees. Then, the device can be done miniaturization and improved the precision.

Further, the scanning optical unit of the color image forming device 1*a* is designed so that the reflected laser beams 9 have almost the same optical path length ranging from the reflection face of the polygon mirror 8 to the surface of each photosensitive drum 5. Each laser beam 9 reflected on the reflection face of the single polygon mirror 8 is guided onto the surface of each photosensitive drum 5, reflected by the four reflection mirrors 10, as many as the photosensitive drums 5, in the color image forming device 1*a* for scanning exposure of the surface of each photosensitive drum 5.

On the optical path of the laser beam 9 ranging from the reflection face of the polygon mirror 8 to the surface of each photosensitive drum 5, an Fθ lens (not shown) is provided that focuses the laser beam 9 reflected on the reflection face of the polygon mirror 8 onto the photosensitive drum 5 to form an image, and conduct scanning exposure along the main scanning direction of the photosensitive drum 5 at a constant speed. Since all the optical paths from the reflection face of the polygon mirror 8 to the surface of each photosensitive drum 5 have the same length in this color image forming device 1*a* of this embodiment, Fθ lenses of the same specification can be used for the reflected laser beams 9. If the Fθ lenses are provided in between the reflection mirror 10 located nearest to the polygon mirror 8 and the reflection mirror 10 located second nearest, the combination of a set of lenses of the same Fθ lens specification for three laser beams and a set of lenses for one laser beam is needed. If the Fθ lenses can be located in between the polygon mirror 8 and reflection mirror 10 located nearest to the polygon mirror 8, only one set of Fθ lenses will be sufficient.

Next, the operation of color image forming device 1*a* according to the present embodiment is explained. Upon the start of operation of the color image forming device 1*a*, the fixing unit 14 is heated up to a predetermined temperature. The electrostatic charger 18 charges the surface of each photosensitive drum 5, prior to exposure.

The four laser sources 17 emit laser beams 9 according to the image information. And the laser beam 9 is irradiated onto the reflection face of the polygon mirror 8 that is rotating at a predetermined speed driven by the motor 20 prepared for rotating the polygon mirror. The respective laser beams 9 reflected on the reflection face of the polygon mirror 8 perform laser scanning driven by rotation of the polygon mirror 8. The laser beams 9 used for scanning are reflected by the reflection mirrors 10 so as not to disturb the scanning operation of another laser beam and then guided onto the surface of the corresponding photosensitive drums 5.

During this scanning exposure process, four laser beams 9 are reflected simultaneously on the same reflection face of the same polygon mirror 8. As a result, the scanning exposure of the photosensitive drum 5 is conducted in the rotary axis direction of the drum, namely in the main scanning direction, simultaneously for all the photosensitive drums 5.

The photosensitive drum 5 is exposed by the laser beam 9; an electrostatic latent image is formed on the exposed area on the surface of the photosensitive drum 5; this electrostatic latent image is developed with the developer held in a developing unit (not shown), as the photosensitive drum turns; and the intermediate image of each color is formed on the surface of the photosensitive drum 5. As the photosensitive drum 5 turns, the area where the intermediate image is formed on the surface of each photosensitive drum 5 contacts the intermediate belt 4 that runs in synchronization with the rotation of the photosensitive drum 5. The transferring roller (not shown) to which a transferring bias has been applied electrically transfers the intermediate image formed on each photosensitive drum 5 onto the surface of the intermediate belt 4. After the first photosensitive drum 5 transfers the intermediate image of a first color onto the intermediate belt 4, the area on the intermediate belt 4 where the intermediate image of a first color has been transferred moves to the next position where the second photosensitive drum 5 is turning that is located next to the first photosensitive drum 5. Then the second photosensitive drum 5 transfers an intermediate image of a second color onto the area where the intermediate image of a first color has already been transferred on the intermediate belt 4. In this way, each photosensitive drum 5 transfers the developer image of each color onto the intermediate belt 4. Intermediate images of different colors are thus transferred so as to overlap each other on the intermediate belt 4. When all the photosensitive drums 5 have completed the transferring of the respective intermediate images, a developer color image is formed on the intermediate belt 4.

The developer color image formed on the intermediate belt 4 is now transported to the roller 3*b* as the intermediate belt 4 runs. On the other hand, in synchronization with the movement of this developer color image, the paper 12 is fed from the paper cassette 13 to between the roller 3*b* and the secondary transferring roller 11. In between the roller 3*b* and the secondary transferring roller 11, the intermediate belt 4 bearing the developer color image and the paper 12 are faced with each other, and then the secondary transferring roller 11 electro-statically transfers the developer color image from the intermediate belt 4 onto the paper 12.

Next, the paper 12 on which a developer color image has been formed is transported almost in the horizontal direction and then inserted into the fixing unit 14 where the developer image is fixed on the paper 12 by heating and pressing. Afterward, the paper 12 is transported upward by the transfer rollers 15 and goes out of the housing from the eject window 16.

On the other hand, the cleaner 19 removes the residual developer on each photosensitive drum 5 that has completed the transferring of the intermediate image onto the intermediate belt 4. The intermediate belt cleaner 7 as well removes the residual developer on the intermediate belt 4 after the developer image has been transferred to the paper 12. The photosensitive drums 5 and the intermediate belt 4 become thus ready for the next image formation.

According to the color image forming device 1*a* of the present embodiment, a single polygon mirror 8 is shared by a plurality of photosensitive drums 5. Thus it is possible to cut the device cost. Besides, since the reflection mirrors 10 of the same quantity as the photosensitive drums 5 are employed in this embodiment, the quantity of reflection mirrors can be reduced, compared with prior art devices. As a result, the device becomes more compact and cost efficient with easier maintenance than conventional devices. In addition, the optical path lengths of the laser beams 9, from the reflection face of the polygon mirror 8 to the surface of each photosensitive drum 5, are almost equal to each other. Then, the optical unit becomes easy to design, and an optical structure of a common specification can be adopted for the photosensitive drums 5. As a result, further cost cutting becomes possible. The fact that Fθ lenses may be shared by different laser beams is another factor that allows further cost cutting.

The combination of the above optical unit and the inclined endless belt contributes to space savings for installation because such an optical unit can be integrated within almost the same horizontal area occupied by the endless belt. Further, since the laser beams 9 are reflected for scanning on the same reflection face of the single polygon mirror 8, it is possible to scan the photosensitive drums 5 simultaneously for exposure along the rotary axis direction, namely, the main scanning direction. Then the banding caused by shifts in the scan timing of the laser beams 9 for the respective photosensitive drums 5 is prevented, and high quality images are provided. Still further, the influence of heat of the fixing unit 14 upon the polygon mirror 8 can be reduced because the polygon mirror 8 is provided away from the fixing unit 14 and the intermediate belt 4 is located in between them.

In the present embodiment, the intermediate belt 4 is suspended by the rollers 3*a*, 3*b* at both its ends. However, additional one or more rollers may be used to support the belt at other positions.

Figure 8:
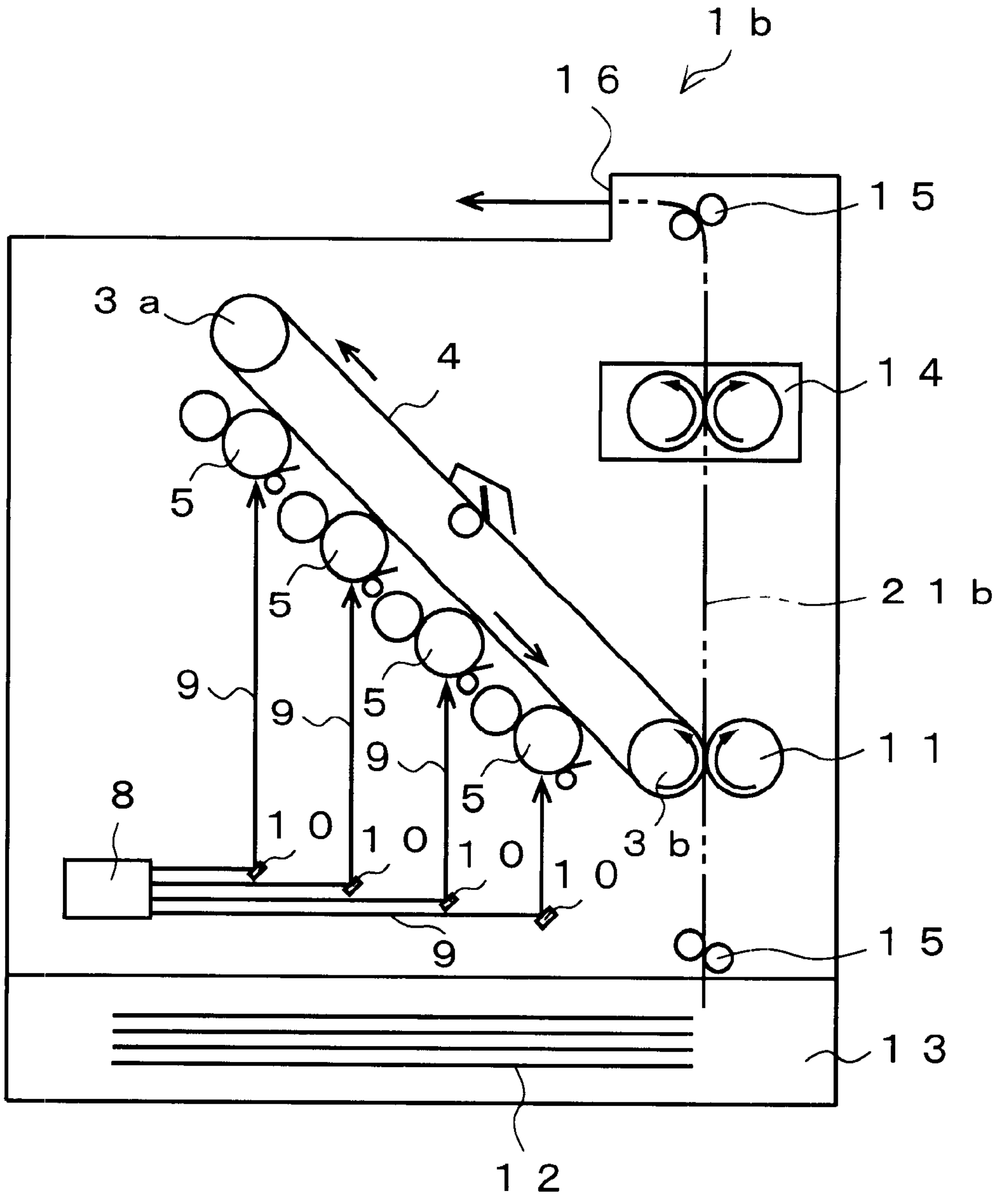
FIG. 8 is a schematic diagram showing the configuration of a color image forming device according to a second embodiment of the present invention.

Next is the explanation of a second embodiment of the present invention. FIG. 8 is a schematic diagram showing the configuration of a color image forming device 1*b* according to the present embodiment. Referring now to FIG. 8, the color image forming device 1*b* features its optical unit where components such as a polygon mirror 8, reflection mirrors 10, and photosensitive drums 5 are provided between the intermediate belt 4 and the paper cassette 13 that is located at the bottom of the housing. The color image forming device 1*b* has a housing 2B that covers the whole device, and inside the housing 2B an endless belt is provided to serve as an intermediate belt 4 looped over at least two rollers 3*a*, 3*b* at both its ends, 45 degrees inclined against the horizontal direction. Four photosensitive drums 5 are provided under the intermediate belt 4 so that they contact the lower surface of the inclined belt. A reflection mirror 10 is provided directly under each photosensitive drum 5, and a polygon mirror 8 is provided on the same level as all the four reflection mirrors 10.

The color image forming device 1*b* has the paper cassette 13 and the rollers 3*a*, 3*b* in the same positions as those in the color image forming device 1*a*. Meanwhile, the positions of the polygon mirror 8, reflection mirrors 10, photosensitive drums 5 and intermediate belt 4 are 180 degrees rotation images of those in the color image forming device 1*a*. The intermediate belt 4 runs in the direction opposite to that of the intermediate belt 4 in the color image forming device 1*a*. The secondary transferring roller 11 is provided beside the roller 3*b* in contact with the roller 3*b*, while the fixing unit 14 is located above the roller 3*b* and the secondary transferring roller 11. Transfer rollers 15 and an eject window 16 are provided above the fixing unit 14. The paper 12 takes a transport path 21*b* in the color image forming device 1*b* from the paper cassette 13, between the roller 3*b* and the secondary transferring roller 11, to the eject window 16 via the fixing unit 14. The transport path 21*b* lies almost vertical in the range between the paper cassette 13 and before the eject window 16. Since the scanning plane scanned by the laser beams 9 that are reflected by the polygon mirror 8 is a horizontal plane, it makes an angle of about 45 degrees with the lower side of the intermediate belt 4 that the photosensitive drums 5 contact.

Next, the operation of color image forming device 1*b* according to the present embodiment will be explained below. The color image forming device 1*b* operates differently from the color image forming device 1*a*, according to difference in the positions of components. In the color image forming device 1*b*, as is the case with the operation of the first embodiment, the laser beams 9 reflected by the polygon mirror 8 are further reflected by the reflection mirrors 10 and then enter the photosensitive drums 5. The photosensitive drums 5 form the intermediate image on the surface of the intermediate belt 4. The area bearing the developer image on the intermediate belt 4 moves to between the roller 3*b* and the secondary transferring roller 11. On the other hand, the paper 12 serving as a recording medium is transported from the paper cassette 13 upwards synchronizing with the operation of the intermediate belt 4, and then inserted in between the roller 3*b* and the secondary transferring roller 11. In between the roller 3*b* and the secondary transferring roller 11, the developer image on the intermediate belt 4 is transferred to the paper 12. Later, the paper 12 is transported upwards and inserted in the fixing unit 14. Next, the developer image is fixed onto the paper 12, being heated and pressed in the fixing unit 14, and then the paper 12 goes out of the housing sent by the transfer rollers 15 from the eject window 16.

The transport path 21*b* of the paper 12 in the color image forming device 1*b* is shorter than that in the color image forming device 1*a* of the first embodiment. Thus it becomes possible to make the device smaller and less expensive.

Figure 9:
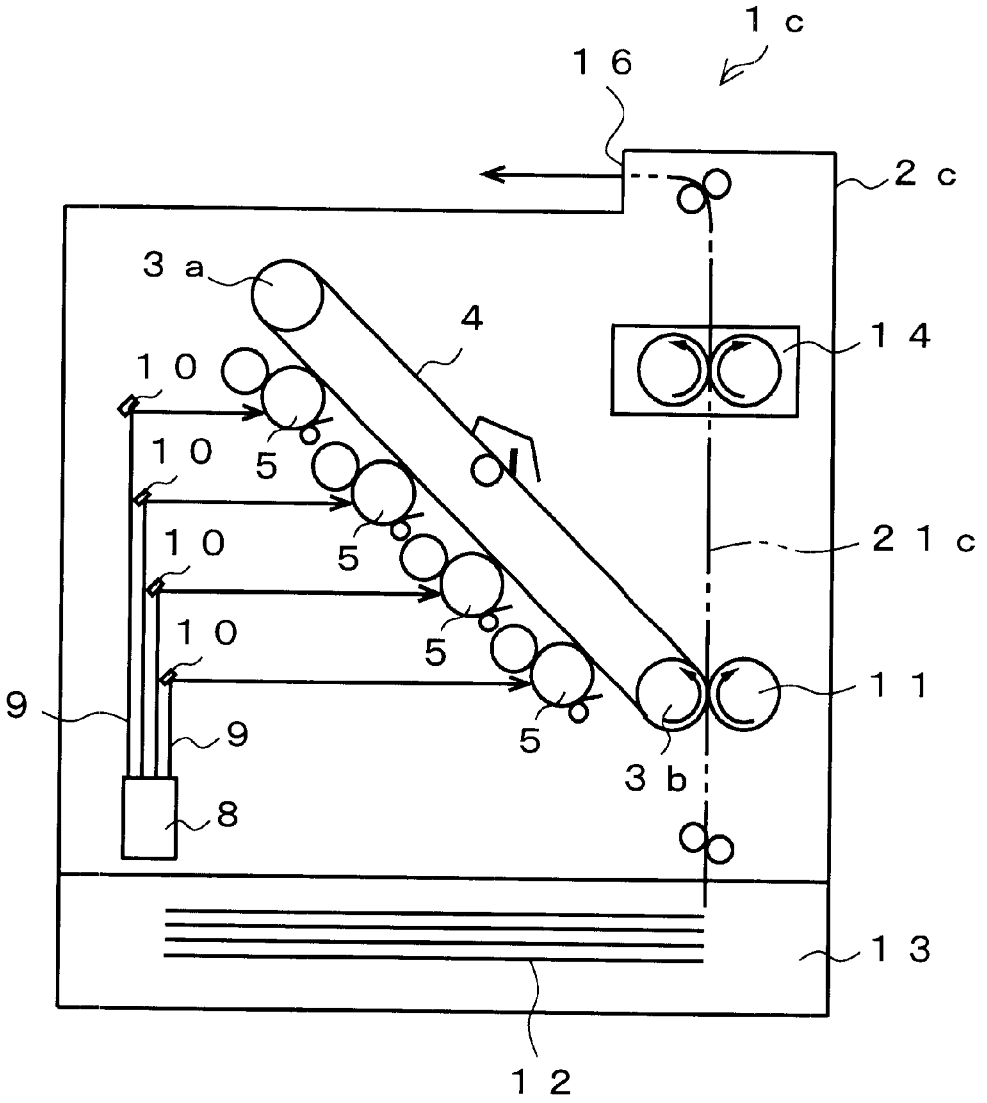
FIG. 9 is a schematic diagram showing the configuration of a color image forming device according to a third embodiment of the present invention.

Next, a third embodiment of the present invention is explained. FIG. 9 is a schematic diagram showing the configuration of a color image forming device 1*c* according to the present embodiment. Different from the color image forming device 1*b* of the second embodiment, in the color image forming device 1*c*, each reflection mirror 10 is located at the same horizontal level of each photosensitive drum 5, and the polygon mirror 8 below the reflection mirrors 10. This configuration makes the laser beams 9 reflected by the polygon mirror 8 form an almost vertical scanning plane, and the laser beams 9 run almost horizontally after reflected by the reflection mirrors 10 until entering the photosensitive drums 5. The operation of the color image forming device 1*c* is the same as that of the color image forming device 1*b* of the second embodiment.

Thus, the developing unit (not shown) that is attached to each photosensitive drum so as not to interrupt the optical path of the laser beam 9 can be made horizontally oriented. Then compared with the vertically oriented developing units employed in the first and second embodiments, the horizontally oriented developing unit makes it easy to stir and transport the developer in the developing unit itself.

Figure 10:
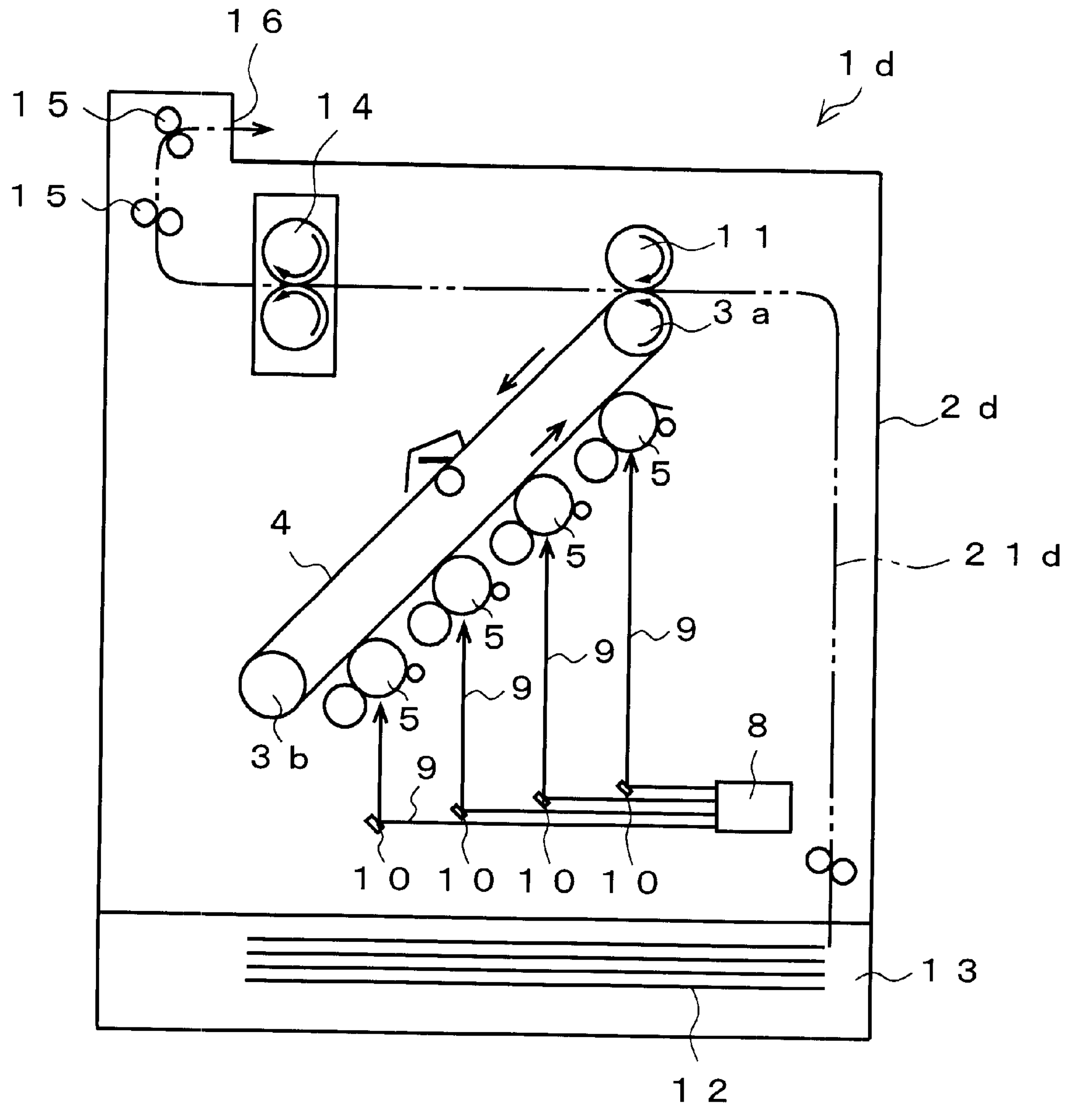
FIG. 10 is a schematic diagram showing the configuration of a color image forming device according to a fourth embodiment of the present invention.

Next, a fourth embodiment of the present invention will be explained below. FIG. 10 is a schematic diagram showing the configuration of a color image forming device 1*d* according to the present embodiment. The feature of the color image forming device 1*d* is that the secondary transferring roller 11 that secondary-transfers the developer image formed on the intermediate belt 4 onto a recording medium (paper 12) is located so as to contact the roller 3*a* that is provided at the upper end of the inclined intermediate belt 4. The color image forming device 1*d* has a housing 2*d* that covers the whole device and has a paper cassette 13 in the bottom of the housing 2*d*. The rollers 3*a*, 3*b*, intermediate belt 4, photosensitive drums 5, developing units (not shown), polygon mirror 8 and reflection mirrors 10 are located in the mirror images of the corresponding components of the second embodiment.

The secondary transferring roller 11 is provided in contact with the roller 3*a*, and the fixing unit 14 is provided above the intermediate belt 4 that is located at almost the same level as the secondary transferring roller 11. The eject window 16 from which the paper 12 goes out is provided near the fixing unit 14 in the housing 2*d*.

The transport path 21*d* of the paper 12 in the color image forming device 1*d* extends upward from the paper cassette 13, changes its course to the horizontal direction at the height near between the roller 3*a* and the secondary transferring roller 11, passes between the roller 3*a* and the secondary transferring roller 11 and then reaches the fixing unit 14. It turns its course behind the fixing unit 14 in the housing to reach the eject window 16 with the front surface of the paper 12 being faced to the inside of the turning.

Next, the operation of the color image forming device 1*d* is described below. In the same way as those described in the first to third embodiments, the polygon mirror 8, reflection mirrors 10 and photosensitive drums 5 create developer images on the intermediate belt 4. Afterward, as the intermediate belt 4 turns, the image area on the intermediate belt 4 where the developer image has been created moves to between the roller 3*a* and the secondary transferring roller 11. Meanwhile, in synchronization with the turn of the intermediate belt 4, the paper 12 is transported almost vertically from the paper cassette 13 and inserted in between the roller 3*a* and the secondary transferring roller 11. In between the roller 3*a* and the secondary transferring roller 11, the developer image is transferred to the paper 12.

Next, the paper 12 is transported almost in the horizontal direction and then inserted into the fixing unit 14 where the developer image is fixed on the paper 12 by heating and pressing. Afterward, the paper 12 is turned upside down, transported by the transfer rollers 15, and goes out of the housing from the eject window 16.

The present embodiment has a merit that the paper 12 comes out, with its transferred face on the top side, by setting its transport path 21*d* to take the way shown in FIG. 10, particularly in the range from the fixing unit 14 to the eject window 16.

Figure 11:
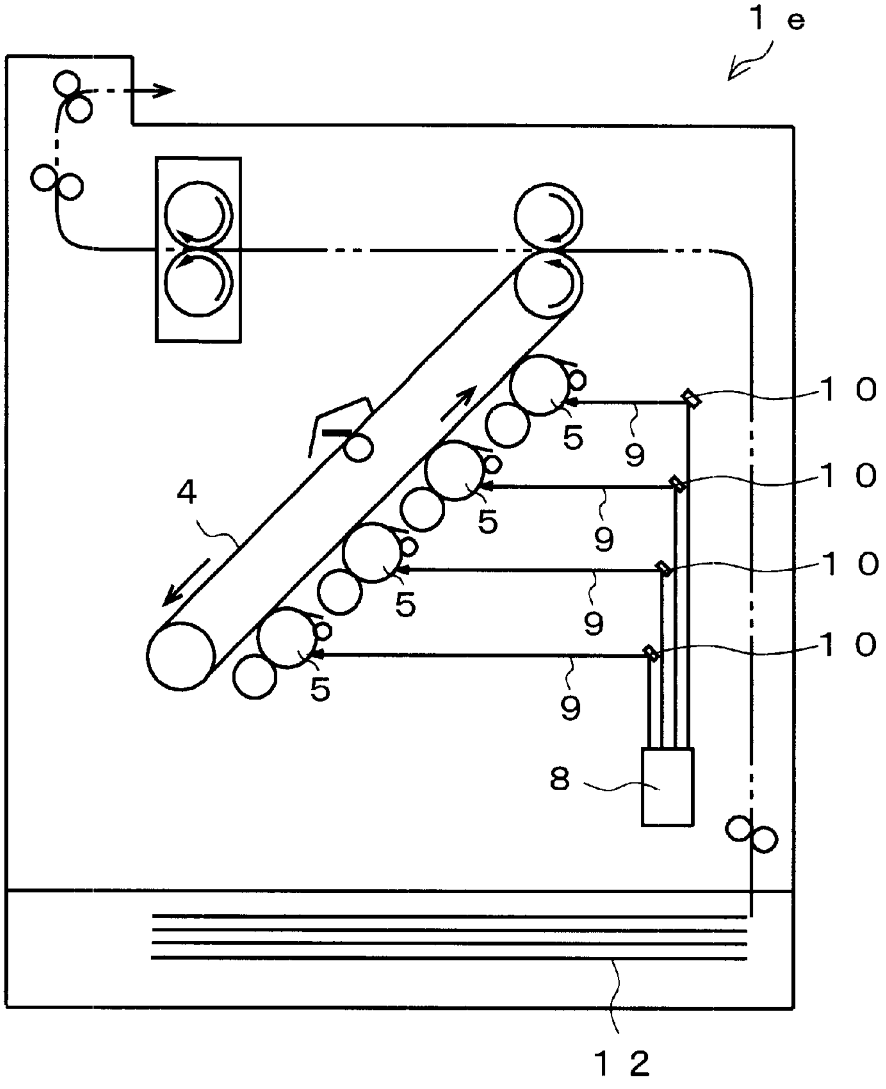
FIG. 11 is a schematic diagram showing the configuration of a color image forming device according to a fifth embodiment of the present invention.

Next, a fifth embodiment of the present invention is explained. FIG. 11 is a schematic diagram showing the configuration of a color image forming device 1*e* according to the present embodiment. The color image forming device 1*e* according to the present embodiment is different from the color image forming device 1*d* of the fourth embodiment in the direction of the arrangement of the optical unit. The positions of the polygon mirror 8 and the reflection mirrors

10 in the color image forming device 1*e* are the same as those in the color image forming device 1*c*. Namely, the scanning plane formed by the laser beams 9 that are reflected by the polygon mirror 8 is formed almost vertically on the polygon mirror 8. Four reflection mirrors 10 are provided directly above the polygon mirror 8. The photosensitive drums 5 are located on the lower side of the intermediate belt 4 at positions each corresponding to the levels of the respective reflection mirrors 10. The laser beams 9 reflected by the reflection mirrors 10 proceed almost horizontally and enter the photosensitive drums 5. The configuration of the components other than the polygon mirror 8 and the reflection mirrors 10 is the same as that of the color image forming device 1*d* of the fourth embodiment.

The operation of the color image forming device 1*e* of the present embodiment is the same as that of the third embodiment until the laser beams 9 reflected by the polygon mirror 8 are reflected by the reflection mirrors 10 and then enter the photosensitive drums 5. Meanwhile, the operation of the present embodiment is the same as that of the fourth embodiment during the period from the time when the photosensitive drums 5 form developer images on the intermediate belt 4 until the paper 12 goes out of the housing.

In the present embodiment, as is the case with the third embodiment, the developing unit (not shown) that is attached to each photosensitive drum can be made horizontally oriented. Then compared with the vertically oriented developing unit, the horizontally oriented developing unit makes it easy to stir and transport the developer in the developing unit. Besides, as is the case with the fourth embodiment, the paper 12 can be ejected with its transferred face on the top side.

Figure 12:
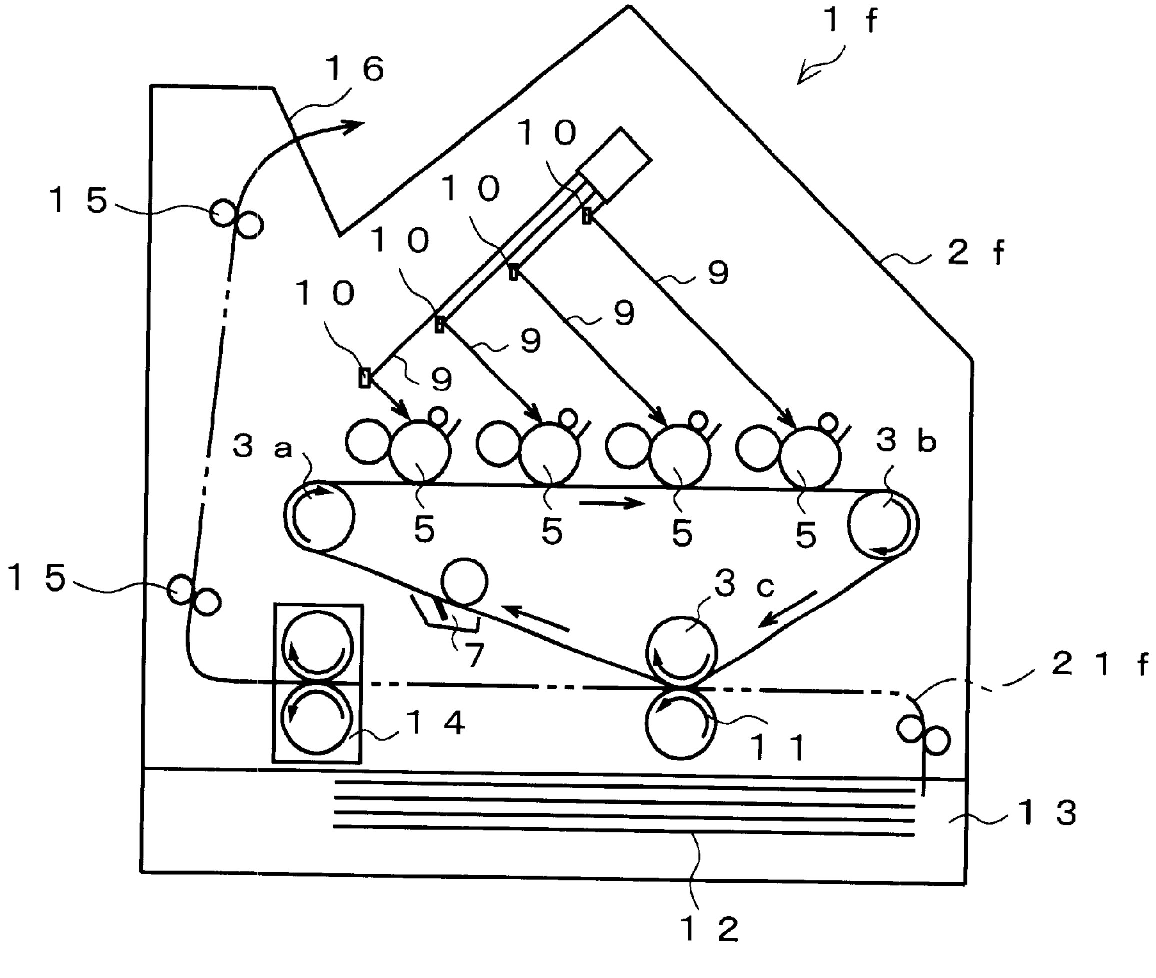
FIG. 12 is a schematic diagram showing the configuration of a color image forming device according to a sixth embodiment of the present invention.

Next, a sixth embodiment of the present invention is explained. FIG. 12 is a schematic diagram showing the configuration of a color image forming device if according to the present embodiment. As shown in FIG. 12, different from the first to fifth embodiments, the intermediate belt 4 is looped over rollers in an inverted triangle shape, and a plurality of photosensitive drums 5 are located in contact with the top horizontal surface of the intermediate belt 4. The optical unit explained in the first embodiment is provided to properly expose the horizontally arrayed photosensitive drums 5, being inclined to the horizontally arranged photosensitive drums 5.

The color image forming device if has a housing 2*f* that covers the whole device and a paper cassette 13 that holds paper 12 serving as the recording medium in the bottom of the housing 2*f*. Above the paper cassette 13, there are three rollers 3*a*, 3*b*, 3*c* provided, and the intermediate belt 4 is looped in an inverted triangle shape. The roller 3*a*, 3*b* are located at the same horizontal level, while the roller 3*c* is located in a position lower than the rollers 3*a* and 3*b*, namely closer to the paper cassette 13. The secondary transferring roller 11 is provided under the roller 3*c* to contact the roller 3*c*, while a fixing unit 14 is provided near the roller 3*a* at almost the same level as the secondary transferring roller 11. The transfer rollers 15 and the eject window 16 are provided above the fixing unit 14. In between the roller 3*c* and the roller 3*a*, the intermediate belt cleaner 7 is provided in contact with the intermediate belt 4. The transport path 21*f* of the paper 12 in the color image forming device if extends from the paper cassette 13 through between the secondary transferring roller 11 and the roller 3*c*, passes the fixing unit 14 in almost the horizontal direction, then changes its course to the almost vertical direction after passing the fixing unit 14, and reaches the eject window 16 via the transfer rollers 15.

In between the roller 3*a* and the roller 3*b* on the surface of the intermediate belt 4, namely on the top side of the intermediate belt 4 looped in an inverted triangle shape, four photosensitive drums 5 are provided. A single polygon mirror 8 and four reflection mirrors 10 are provided above the intermediate belt 4. The polygon mirror 8 reflects the laser beams 9 and forms scanning planes that are inclined by 45 degrees against the horizontal direction. The reflection mirror 10 is located on each scanning plane to reflect the laser beam 9 traveling from the polygon mirror 8 toward the photosensitive drum 5. This scanning plane is about 45 degrees inclined to the plane where the photosensitive drums 5 are arrayed.

Next, the operation of the present embodiment is explained below. The intermediate belt 4 moves in the direction from the roller 3*a* to 3*c* via 3*b*. Based on the same mechanism as that described in the first to fifth embodiments, the polygon mirror 8, reflection mirrors 10 and photosensitive drums 5 form developer images onto the intermediate belt 4. Later, as the intermediate belt 4 runs, the area bearing the developer image on the intermediate belt 4 passes on the roller 3*b* and to between the roller 3*c* and the secondary transferring roller 11. Meanwhile, in synchronization with the rotation of the intermediate belt 4, the paper 12 is fed from the paper cassette 13, transported in the almost horizontal direction, and then inserted in between the roller 3*c* and the secondary transferring roller 11. In between the roller 3*c* and the secondary transferring roller 11, the developer image on the intermediate belt 4 is transferred to the paper 12.

Subsequently, the paper 12 is transported in the almost horizontal direction and inserted in the fixing unit 14. The paper 12 is heated and pressed in the fixing unit 14, and thereby the developer image is fixed onto the paper 12. Later, the paper 12 is sent upwards almost vertically and discharged from the eject window 16 to the outside of the housing.

In the present embodiment, because three rollers hold the intermediate belt 4, the position of the secondary transferring roller 11 is not limited by the location of the intermediate belt 4. Thus the flexibility of device design is improved.

The optical unit including the polygon mirror 8 and the reflection mirrors 10 may be located in the mirror positions of the corresponding components shown in FIG. 12. Namely, the photosensitive drum 5 most distant from the fixing unit 14 may be positioned to have the shortest distance from the corresponding, with regard to the relative location between the photosensitive drums 5 and the corresponding reflection mirrors 10.

Figure 13:
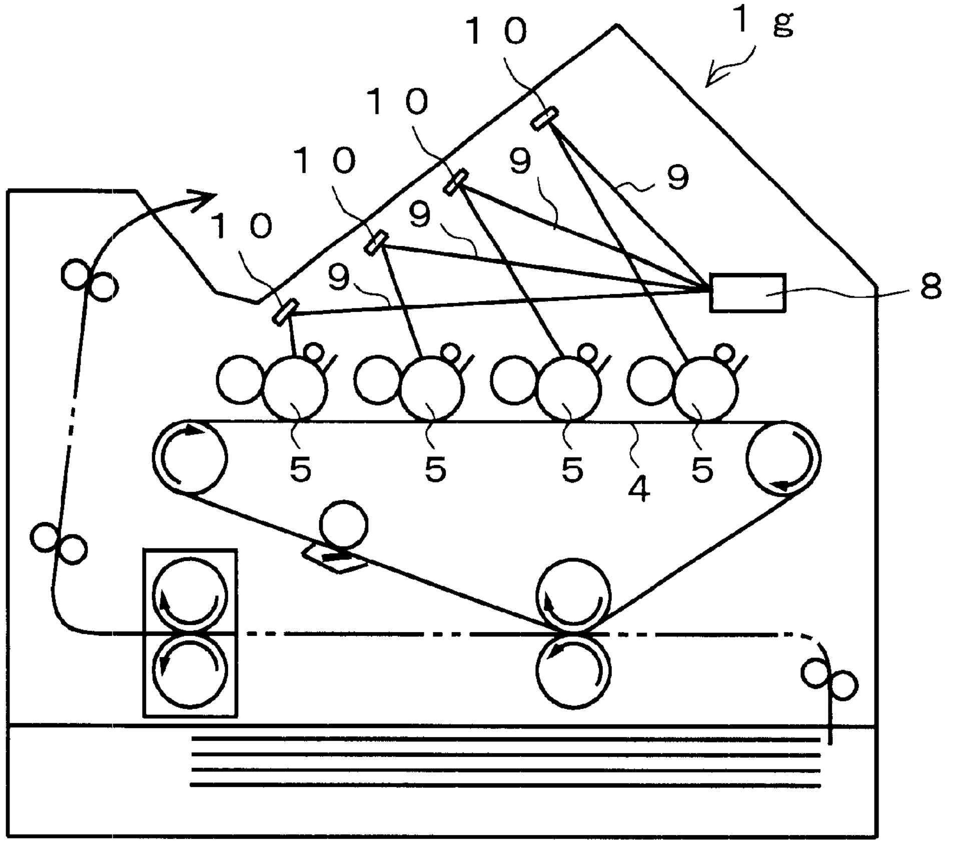
FIG. 13 is a schematic diagram showing the configuration of a color image forming device according to a seventh embodiment of the present invention.

Next, a seventh embodiment of the present invention is explained below. FIG. 13 is a schematic diagram showing the configuration of a color image forming device 1*g* according to the present embodiment. Compared with the color image forming device if according to the sixth embodiment, the color image forming device 1*g* has a different configuration of the polygon mirror 8 and the reflection mirrors 10. In the first to sixth embodiments, the scanning plane formed by the four laser beams 9 driven by the rotating polygon mirror 8 is not parallel to the top surface of the intermediate belt 4; however, the laser beams are reflected so as to make the resulting scanning planes parallel to each other. On the other hand in the present embodiment, although the optical path lengths of the four respective laser beams 9, from the reflection face of the polygon mirror 8 to the respective photosensitive drums 5 are equal to each other, the laser beams 9 are reflected on the polygon mirror 8 to the directions different from each other. The configuration of the color image forming device 1*g* except for the polygon mirror 8 and the reflection mirrors 10 is the same as that of the color image forming device if of the sixth embodiment.

In the present embodiment, the four laser beams 9 are reflected to different directions by the polygon mirror 8 to form the respective scanning planes. Each scanning plane makes a different angle with the horizontal plane. The laser beams 9 reflected by the polygon mirror 8 are further reflected by the reflection mirrors 10 and enter the photosensitive drums 5. The device operation after this point of time in the present embodiment is the same as that of the sixth embodiment.

Compared with the sixth embodiment, the present embodiment makes it possible to provide the polygon mirror 8 and the reflection mirrors 10 at lower positions in the housing. Thus it becomes possible to make both height and volume of the housing small.

Figure 14:
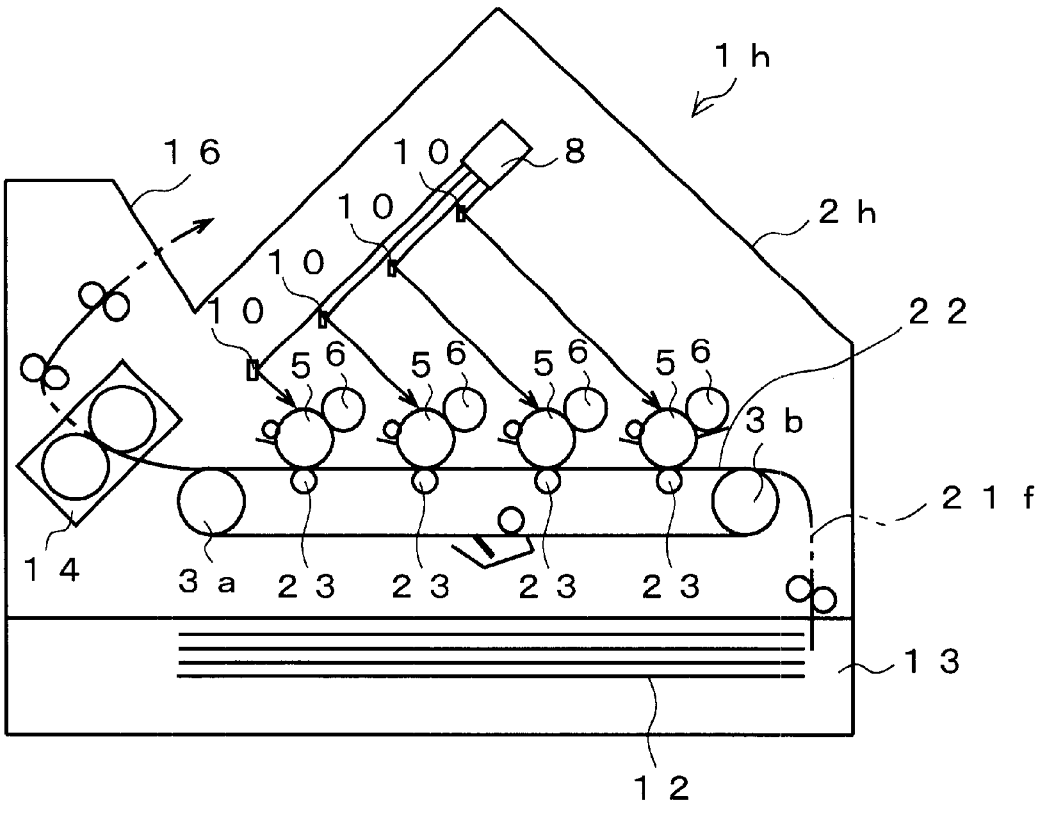
FIG. 14 is a schematic diagram showing the configuration of a color image forming device according to an eighth embodiment of the present invention.

Next, an eighth embodiment of the present invention is explained below. FIG. 14 is a schematic diagram showing the configuration of a color image forming device 1*h* according to the present embodiment. In the present embodiment, different from the first to seventh embodiments, the intermediate images formed on the photosensitive drums 5 are transferred directly onto the recording medium by a continuous image formation process. In order to do so, the endless belt looped over the rollers at both its ends works as not an intermediate belt but a paper transport belt 22.

As shown in FIG. 14, the color image forming device 1*h* according to the present embodiment has a housing 2*h* that covers the whole device and a paper cassette 13 that stores paper 12 serving as the recording medium in the bottom of the housing 2*h*. Two rollers 3*a*, 3*b* are provided on the same horizontal level in parallel to each other above the paper cassette 13. A paper transport belt 22 made of an endless-belt is looped over the rollers 3*a*, 3*b* at both its ends. A fixing unit 14 is provided next to the paper transport belt 22 so that it is adjacent to the roller 3*a*, and an eject window 16 is provided above the fixing unit 14. The transport path 21*h* of the paper 12 in the color image forming device 1*h* extends upward from the paper cassette 13 to the spot supported by the roller 3*b* on the paper transport belt 22, runs horizontally toward the roller 3*a* on the paper transport belt 22, leaves the paper transport belt 22 at the position supported by the roller 3*a*, passes the fixing unit 14 and then changes its course upward in a slanting direction to reach the eject window 16.

There are four photosensitive drums 5 arrayed on the top surface on the paper transport belt 22. Close to each photosensitive drum 5, a developing unit (not shown) equipped with a developing roller 6 is provided. A transferring roller 23 is provided on the opposite side of each photosensitive drum 5 on the paper transport belt 22 so that it contacts the paper transport belt 22. In addition, four reflection mirrors 10 and one polygon mirror 8 are provided above the photosensitive drums 5. The polygon mirror 8 forms scanning planes that are inclined about 45 degrees to the horizontal direction, reflecting the laser beams 9. The reflection mirrors 10 are provided on these scanning planes, and the laser beams 9 that have been reflected by the polygon mirror 8 are further reflected by the reflection mirrors 10 and then enter the photosensitive drums 5. The reflection mirrors 10 and the polygon mirror 8 are arranged so that the optical path lengths of the respective laser beams 9, from the polygon mirror 8 to each photosensitive drum 5, become equal to each other. The scanning planes make an angle of about 45 degrees against the plane circumscribing the photosensitive drums 5 on the paper transport belt 22.

Next, the operation of the color image forming device 1*h* is explained below. First, an intermediate image is formed on each photosensitive drum 5 by the method described in the sixth embodiment. Then, with synchronization with the rotation of the photosensitive drum 5, the paper 12 is fed from the paper cassette 13 and sent by the paper transport belt 22 to the place where it contacts the photosensitive drum 5. The intermediate image is transferred to the paper 12 from the photosensitive drum 5. Namely, after the transferring roller 23 has transferred the intermediate image of a first color from the first photosensitive drum 5 to the paper 12, the area bearing the intermediate image of the first color on the paper 12 moves to the position that contacts the second photosensitive drum 5 located next to the first photosensitive drum 5. Then the second photosensitive drum 5 transfers the intermediate image of a second color onto the area where the intermediate image of the first color has already been transferred on the paper 12. In this way, each photosensitive drum 5 transfers its intermediate image of a different color onto the paper 12. The intermediate images of different colors are thereby overlapped one onto another on the paper 12. When all the intermediate images have been transferred from the photosensitive drums 5, a color developer image appears on the paper 12. During this process, the intermediate images on the photosensitive drums 5 are transferred one onto another on the paper 12 from each photosensitive drum 5, with a careful positioning. Later, the paper 12 is transported to the fixing unit 14. In the fixing unit 14, the paper 12 is heated and pressed, and then goes out from the eject window 16 to outside the housing after the developer image has been fixed on the paper 12.

According to the present embodiment, it is possible to omit the secondary transferring roller from the device because the developer image is formed onto the paper 12 by transferred intermediate images directly from the photosensitive drums 5. Then the structure of the color image forming device can be simplified and thus the device can be made compact and inexpensive.

The optical unit including the polygon mirror 8 and the reflection mirrors 10 may be located in the mirror positions of the corresponding components shown in FIG. 14. Namely, the photosensitive drum 5 most distant from the fixing unit 14 may be positioned to have the shortest distance from the corresponding, with regard to the relative location between the photosensitive drums 5 and the corresponding reflection mirrors 10.

Besides, the paper transport belt 22 may be looped, inclined as the intermediate belt 4 of the first to fifth embodiments, and the fixing unit 14 may be provided above the paper transport belt 22.

Figure 15:
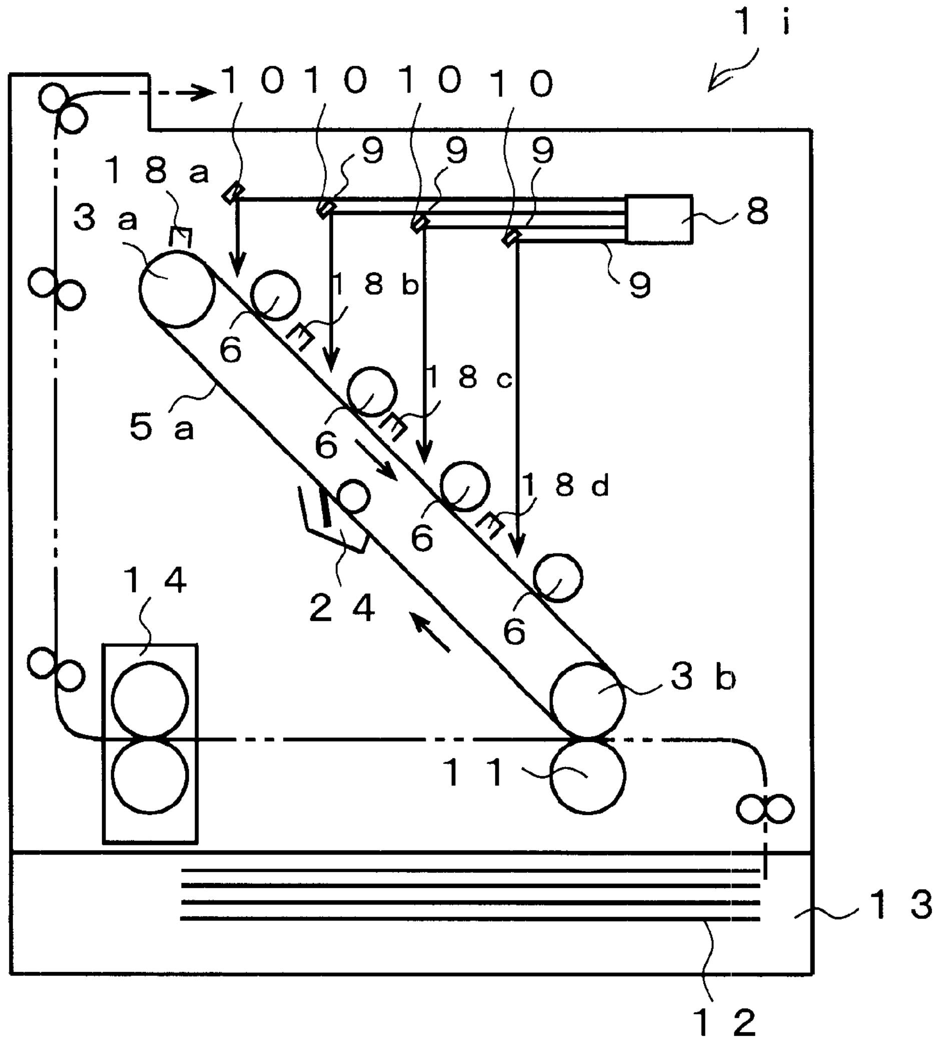
FIG. 15 is a schematic diagram showing the configuration of a color image forming device according to a ninth embodiment of the present invention.

Next, a ninth embodiment of the present invention is explained below. FIG. 15 is a schematic diagram showing the configuration of a color image forming device 1*i* according to the present embodiment. The color image forming device 1*i* features its image formation process in which: a photosensitive belt 5*a* as a photosensitive device made of an endless belt is provided; the intermediate images of different colors are overlapped one onto another on this photosensitive belt 5*a*; and the color images formed on the photosensitive belt 5*a* are transferred on the recording medium at a time. The color image forming device 1*i* has an inclined endless belt serving as the photosensitive belt 5*a* which is looped over rollers 3*a*, 3*b* at both its ends. The photosensitive belt 5*a* is inclined about 45 degrees to the horizontal direction. The roller 3*a* is located above the roller 3*b*.

On the inclined top surface of the photosensitive belt 5*a*, electrostatic chargers 18*a*–18*d* are provided to charge the photosensitive belt 5*a* before the surface of the photosensitive belt 5*a* is exposed by the laser beams 9. In addition, developing units (not shown) filled with developers of different colors are provided to develop the latent electrostatic images formed on the photosensitive belt 5*a* after exposure. Each developing unit has a developing roller 6 in it. A photosensitive belt cleaner 24 is provided on the bottom side of the photosensitive belt 5*a* in contact with the photosensitive belt 5*a* for cleaning the surface of the photosensitive belt 5*a*. A secondary transferring roller 11 is provided under the roller 3*b* in contact with the roller 3*b*. The secondary transferring roller 11 transfers the image formed on the photosensitive belt 5*a* to the paper 12 serving as the recording medium. The configuration of the color image forming device 1*i* except for the photosensitive belt 5*a*, developing units (not shown) and the electrostatic chargers 18*a*–18*d* is the same as that of the color image forming device 1*a* of the first embodiment.

Next, the operation of the color image forming device 1*i* is explained below. First, in the same ways as described in the first embodiment, the laser beams 9 reflected on the reflection face of the polygon mirror 8 for scanning are directed by the reflection mirrors 10 toward the photosensitive belt 5*a* that has been looped in an inclined state. As the photosensitive belt 5*a* runs, the area where images will be formed on the top surface of the photosensitive belt 5*a* moves in the direction from the roller 3*a* to the roller 3*b*, and then electrically charged by the electrostatic charger 18*a*. Next, the laser beam 9 that has been reflected by the reflection mirror 10 located on the leftmost in FIG. 15, which is the mirror closest to the surface of the photosensitive belt 5*a*, exposes the first exposure position on the photosensitive belt 5*a*. This area of the photosensitive belt 5*a* is exposed when passing this first exposure position, and then the first latent electrostatic image is formed there. Subsequently, this latent electrostatic image is developed by the first developing unit that has a developing roller 6, and the intermediate image of a first color is formed on the photosensitive belt 5*a*.

After the formation of the intermediate image of the first color, the above area moves to the second exposure position next to the first exposure position. In this way the second, third and fourth charge, exposure and development steps are repeated to form the intermediate images of second, third and fourth colors. During this process, the intermediate images of different colors are formed one onto another on the photosensitive belt 5*a*, and a color developer image is completed on the photosensitive belt 5*a* when the intermediate images have been formed on all the exposure positions.

In the present embodiment, at least the second to fourth developing units develop the latent electrostatic image on the photosensitive belt 5*a* with no contact with this belt so as not to affect the intermediate images already formed at the previous steps.

The color image formed in this way on the photosensitive belt 5*a* is transported to between the roller 3*b* and the secondary transferring roller 11 as the photosensitive belt 5*a* runs. Meanwhile, in synchronization with the rotation of the photosensitive belt 5*a*, the paper 12 serving as the recording medium is fed from the paper cassette 13 to between the roller 3*b* and the secondary transferring roller 11 in contact with the photosensitive belt 5*a*. Later, the color developer image formed on the photosensitive belt 5*a* is transferred to the paper 12 in between the roller 3*b* and the secondary transferring roller 11. Finally, the paper 12 is sent to the fixing unit 14 for heating and pressing treatment there for fixing the developer image and then goes out of the housing.

The configuration of the present embodiment makes it possible to reduce the quantity of the photosensitive devices down to one by employing the photosensitive belt 5*a* and eventually make the device compact and inexpensive.

The first to seventh embodiments as well may use the photosensitive belt 5*a* on behalf of the intermediate belt 4 and provide the developing units of different colors on the photosensitive belt 5*a*, as is the case with the present embodiment.

The material for the endless belt as the intermediate belt 4 and the paper transport belt 22 used in the first to eighth embodiments should be semi-conductive, uniform in its electrical properties over the whole areas, resistant to harsh operating environment and of minimum fluctuations in quality. In terms of its mechanical properties, it should be a material resistant to crack generation and abrasion and free of toner filming. For example, such a material is a polycarbonate(PC) where carbon is dispersed. In addition to PC, fluorine-based materials may be used as well. Thermoset polyimide, denatured thermoset polyimide, thermoplastic polyimide, polyether ether ketone, poly vinylidene fluoride, etylene-tetrafluoroethylene copolymer and nylon alloys are preferable materials for the belts. The required mechanical requirements are fulfilled by dispersing high heat-conductive or high-rigidity fillers in those resins. The electric resistance of the material of the endless belts is preferably in the $10^3$ to $10^{15}\Omega$ range. If the surface of the endless belt is coated with silicon or fluororesin, it will be easy for die releasing.

Non-contact type devices like corotron as well as such contact type transferring devices as rollers, blades and brushes may be used for image transferring and secondary transferring. Porous elastic materials or soft materials of semi-conductive properties with an electric resistance in the $10^6$ to $10^{10}\Omega$ range are preferable for the transferring rollers.

The developing unit may adopt either one-element or two-element developing method. The photosensitive drum may be either an organic or inorganic photosensitive drum, and may be either a single- or multi-layer photosensitive drum.

As the polygon mirror 8, a mechanically finished metallic mirror or a resin mirror of which surface has a coat of evaporated metal may be used. The Fθ lens may be made of glass or molded resin. The laser source 17 is required to emit light of a wavelength to which the photosensitive drum 5 and the photosensitive belt 5*a* are sensitive; however, there is no other limitation to the generated laser. Blue-violet laser of a relatively short wavelength may be used.

The first to ninth embodiments have been described under an assumption that a powder-type developer is used. However, a developing unit may be employed that uses liquid-type developers that can provide clear images of high quality.

In the first to ninth embodiments, the color image forming device had four each of the reflection mirror 10, photosensitive drum 5 and developing unit in order to form intermediate images of four colors overlapping each other. However, the number of employed colors may be either three or less, or five or more, instead of four.

What is claimed is:

1. A color image forming device for forming a color image of a plurality of colors on a recording medium, comprising:

a laser source for emitting a plurality of laser beams based on image information;

a plurality of photosensitive drums;

one polygon mirror that rotates and reflects laser beams emitted from said laser sources for laser scanning;

a plurality of reflection mirrors provided for said respective photosensitive drums and located in an optical path between said polygon mirror and each of said photosensitive drums, said reflection mirrors reflecting the laser beams traveling from said polygon mirror towards said photosensitive drums for scanning said respective photosensitive drums, and the reflection mirror having the longer optical path from the reflection mirror to the corresponding photosensitive drum being provided more closely to said polygon mirror than the reflection mirror having the optical path from the reflection mirror to the corresponding photosensitive drum shorter than that of the reflection mirror of longer optical path, and all optical path lengths from said polygon mirror to the corresponding photosensitive drums via said reflection mirrors being equal to each other;

developing units for developing latent electrostatic images formed by said laser beams on said photosensitive drums to provide an intermediate image formed by mono-color developer;

an intermediate image carrier made of an endless belt and driven in one direction, said photosensitive drums being provided along said intermediate image carrier and being in contact with and rotated with said intermediate image carrier to transfer said intermediate images of mono-color to said intermediate image carrier so as to overlap each other to form a color developer image;

a transfer unit for transferring said color developer image from said intermediate image carrier to said recording medium; and a fixing unit for fixing said color developer image on said recording medium;

wherein said plurality of photosensitive drums are provided on a imaginary flat plane which makes an angle larger than zero degree and less than 90 degrees with a scanning plane of the laser beams from said polygon mirror.

2. The color image forming device according to claim 1, wherein said angle is between 15 to 75 degree.

3. The color image forming device according to claim 1, wherein said imaginary flat plane is inclined to a horizontal plane.

4. The color image forming device according to claim 1, wherein said intermediate image carrier is provided more closely to said polygon mirror than said fixing unit.

5. The color image forming device according to claim 1, wherein the optical paths of the laser beams reflected by said reflection mirrors are substantially parallel to each other.

6. A color image forming device for forming a color image of a plurality of colors on a recording medium comprising:

a laser source for emitting a plurality of laser beams based on image information;

a plurality of photosensitive drums;

one polygon mirror that rotates and reflects laser beams emitted from said laser sources for laser scanning;

a plurality of reflection mirrors provided for said respective photosensitive drums and located in an optical path between said polygon mirror and each of said photosensitive drums, said reflection mirrors reflecting the laser beams traveling from said polygon mirror towards said photosensitive drums for scanning said respective photosensitive drums, and the reflection mirror having the longer optical path from the reflection mirror to the corresponding photosensitive drum being provided more closely to said polygon mirror than the reflection mirror having the optical path from the reflection mirror to the corresponding photosensitive drum shorter than that of the reflection mirror of longer optical path, and all optical path lengths from said polygon mirror to the corresponding photosensitive drums via said reflection mirrors being equal to each other;

developing units for developing latent electrostatic images formed by said laser beams on said photosensitive drums to provide an intermediate image formed by a mono-color developer;

a recording medium transport unit made of an endless belt and driven in one direction, which transports said recording medium, said photosensitive drums being provided along said recording medium transport unit and being in contact with and driven with said recording medium to transfer said intermediate images of mono-color to said recording medium so as to overlap each other to form a color developer image; and a fixing unit for fixing said color developer images on said recording medium;

wherein said plurality of photosensitive drums are provided on a imaginary flat plane which makes an angle larger than zero degrees and less than 90 degrees with a scanning plane of the laser beams from said polygon mirror.

7. The color image forming device according to claim 6, wherein said angle is between 15 to 75 degree.

8. The color image forming device according to claim 6, wherein said imaginary flat plane is inclined to a horizontal plane.

9. The color image forming device according to claim 6, wherein said recording medium transport unit is provided more closely to said polygon mirror that said fixing unit.

10. A color image forming device for forming a color image of a plurality of colors on a recording medium comprising:

a laser source for emitting a plurality of laser beams based on image information;

a photosensitive belt made of an endless belt and driven in one direction, on which said laser beams are exposed at a plurality of laser beam exposure portions different from each other and provided along on said photosensitive belt;

a plurality pairs of an electrostatic charger and a developing roller provided for each of said laser beam exposure portions, said electrostatic charger charging said photosensitive belt and said developing roller developing a latent image formed by exposure of said laser beam;

one polygon mirror that rotates and reflects laser beams emitted from said laser sources for laser scanning;

a plurality of reflection mirrors reflecting the laser beams traveling from said polygon mirror towards said photosensitive belt for scanning said photosensitive belt at said laser beam exposure portions, to form said latent images so as to form intermediate images of mono-color developer by said developing roller on said photosensitive belt driven in one direction so as to overlap each other to form a color developer image, and the reflection mirror having the longer optical path from the reflection mirror to the corresponding laser beam exposure portion being provided more closely to said polygon mirror than the reflection mirror having the optical path from the reflection mirror to the corresponding exposure portion shorter than that of the reflection mirror of longer optical path, and all optical path lengths from said polygon mirror to the corresponding exposure portions via said reflection mirrors being equal to each other;

a transfer unit for transferring said color developer image from said photosensitive belt to said recording medium; and a fixing unit for fixing said color developer images on said recording medium.

11. The color image forming device according to claim 10, wherein said plurality of developing rollers are provided on a imaginary flat plane which makes an angle larger than zero degree and less than 90 degrees with a scanning plane of the laser beams from said polygon mirror.

12. The color image forming device according to claim 11, wherein said angle is between 15 to 75 degree.

13. The color image forming device according to claim 11, wherein said imaginary flat plane is inclined to a horizontal plane.

14. The color image forming device according to claim 11, wherein said photosensitive belt is provided more closely to said polygon mirror than said fixing unit.

15. A color image forming device for forming a color image of a plurality of colors on a recording medium, comprising:

a laser source for emitting a plurality of laser beams based on image information;

a plurality of photosensitive drums;

one polygon mirror that rotates and reflects laser beams emitted from said laser sources for laser scanning;

a plurality of reflection mirrors provided for said respective photosensitive drums and located in an optical path between said polygon mirror and each of said photosensitive drums, said reflection mirrors reflecting the laser beams traveling from said polygon mirror towards said photosensitive drums for scanning said respective photosensitive drums, and the reflection mirror having the longer optical path from the reflection mirror to the corresponding photosensitive drum being provided more closely to said polygon mirror than the reflection mirror having the optical path from the reflection mirror to the corresponding photosensitive drum shorter than that of the reflection mirror of longer optical path, and all optical path lengths from said polygon mirror to the corresponding photosensitive drums via said reflection mirrors being equal to each other;

developing units for developing latent electrostatic images formed by said laser beams on said photosensitive drums to provide an intermediate image formed by mono-color developer;

an intermediate image carrier made of an endless belt and driven in one direction, said photosensitive drums being provided along said intermediate image carrier and being in contact with and rotated with said intermediate image carrier to transfer said intermediate images of mono-color to said intermediate image carrier so as to overlap each other to form a color developer image;

a transfer unit for transferring said color developer image from said intermediate image carrier to said recording medium; and a fixing unit for fixing said color developer image on said recording medium;

wherein the optical paths from said polygon mirror to said respective reflection mirrors are substantially parallel to each other.

16. A color image forming device for forming a color image of a plurality of colors on a recording medium comprising:

a laser source for emitting a plurality of laser beams based on image information;

a plurality of photosensitive drums;

one polygon mirror that rotates and reflects laser beams emitted from said laser sources for laser scanning;

a plurality of reflection mirrors provided for said respective photosensitive drums and located in an optical path between said polygon mirror and each of said photosensitive drums, said reflection mirrors reflecting the laser beams traveling from said polygon mirror towards said photosensitive drums for scanning said respective photosensitive drums, and the reflection mirror having the longer optical path from the reflection mirror to the corresponding photosensitive drum being provided more closely to said polygon mirror than the reflection mirror having the optical path from the reflection mirror to the corresponding photosensitive drum shorter than that of the reflection mirror of longer optical path, and all optical path lengths from said polygon mirror to the corresponding photosensitive drums via said reflection mirrors being equal to each other;

developing units for developing latent electrostatic images formed by said laser beams on said photosensitive drums to provide an intermediate image formed by mono-color developer;

an intermediate image carrier made of an endless belt and driven in one direction, said photosensitive drums being provided along said intermediate image carrier and being in contact with and rotated with said intermediate image carrier to transfer said intermediate images of mono-color to said intermediate image carrier so as to overlap each other to form a color developer image;

a transfer unit for transferring said color developer image from said intermediate image carrier to said recording medium; and a fixing unit for fixing said color developer image on said recording medium;

wherein said reflection mirrors are located on the same plane; and wherein said plane is substantially horizontal.

17. A color image forming device for forming a color image of a plurality of colors on a recording medium comprising:

a laser source for emitting a plurality of laser beams based on image information;

a plurality of photosensitive drums;

one polygon mirror that rotates and reflects laser beams emitted from said laser sources for laser scanning;

a plurality of reflection mirrors provided for said respective photosensitive drums and located in an optical path between said polygon mirror and each of said photosensitive drums, said reflection mirrors reflecting the laser beams traveling from said polygon mirror towards said photosensitive drums for scanning said respective photosensitive drums, and the reflection mirror having the longer optical path from the reflection mirror to the corresponding photosensitive drum being provided more closely to said polygon mirror than the reflection mirror having the optical path from the reflection mirror to the corresponding photosensitive drum shorter than that of the reflection mirror of longer optical path, and all optical path lengths from said polygon mirror to the corresponding photosensitive drums via said reflection mirrors being equal to each other;

developing units for developing latent electrostatic images formed by said laser beams on said photosensitive drums to provide an intermediate image formed by mono-color developer;

an intermediate image carrier made of an endless belt and driven in one direction, said photosensitive drums being provided along said intermediate image carrier and being in contact with and rotated with said intermediate image carrier to transfer said intermediate images of mono-color to said intermediate image carrier so as to overlap each other to form a color developer image;

a transfer unit for transferring said color developer image from said intermediate image carrier to said recording medium; and a fixing unit for fixing said color developer image on said recording medium;

wherein said reflection mirrors are located on the same plane; and wherein said plane is substantially vertical.

* * * * *